(12) United States Patent
Fishman et al.

(10) Patent No.: US 9,456,141 B2
(45) Date of Patent: Sep. 27, 2016

(54) LIGHT-FIELD BASED AUTOFOCUS

(71) Applicant: Lytro, Inc., Mountain View, CA (US)

(72) Inventors: Alex Fishman, San Jose, CA (US); Timothy Knight, Palo Alto, CA (US); Yuriy Romanenko, San Jose, CA (US); Jeff Kalt, San Francisco, CA (US)

(73) Assignee: Lytro, Inc., Mountain View, CA (US)

( * ) Notice: Subject to any disclaimer, the term of this patent is extended or adjusted under 35 U.S.C. 154(b) by 195 days.

(21) Appl. No.: 13/867,333

(22) Filed: Apr. 22, 2013

(65) Prior Publication Data

US 2014/0240578 A1    Aug. 28, 2014

Related U.S. Application Data

(63) Continuation-in-part of application No. 13/774,986, filed on Feb. 22, 2013.

(51) Int. Cl.
*H04N 5/232* (2006.01)

(52) U.S. Cl.
CPC ...... *H04N 5/23293* (2013.01); *H04N 5/23212* (2013.01)

(58) Field of Classification Search
None
See application file for complete search history.

(56) References Cited

U.S. PATENT DOCUMENTS

| | | |
|---|---|---|
| 4,661,986 A | 4/1987 | Adelson |
| 4,920,419 A | 4/1990 | Easterly |
| 5,076,687 A | 12/1991 | Adelson |
| 5,748,371 A | 5/1998 | Cathey, Jr. et al. |
| 5,949,433 A | 9/1999 | Klotz |
| 6,023,523 A | 2/2000 | Cohen et al. |
| 6,097,394 A | 8/2000 | Levoy et al. |
| 6,201,899 B1 | 3/2001 | Bergen |
| 6,320,979 B1 | 11/2001 | Melen |
| 6,842,297 B2 | 1/2005 | Dowski, Jr. et al. |
| 7,034,866 B1 | 4/2006 | Colmenarez et al. |
| 7,620,309 B2 | 11/2009 | Georgiev |
| 7,623,726 B1 | 11/2009 | Georgiev |
| 7,723,662 B2 | 5/2010 | Levoy et al. |

(Continued)

FOREIGN PATENT DOCUMENTS

| | | |
|---|---|---|
| WO | 2006039486 | 4/2006 |
| WO | 2006129677 | 12/2006 |
| WO | 2007092545 | 8/2007 |

OTHER PUBLICATIONS

Haeberli, Paul, "A Multifocus Method for Controlling Depth of Field" Graphica Obscura, 1994, pp. 1-3.

(Continued)

*Primary Examiner* — Roberto Velez
*Assistant Examiner* — Yih-Sien Kao
(74) *Attorney, Agent, or Firm* — Raubvogel Law Office

(57) ABSTRACT

In various embodiments, the present invention relates to methods, systems, architectures, algorithms, designs, and user interfaces for light-field based autofocus. In response to receiving a focusing request at a camera, a light-field autofocus system captures a light-field image. An image crop that contains a region of interest and a specified border is determined. A series of refocused images are generated for the image crop at different scene depths. A focus metric is calculated for each refocused image. The scene depth of the refocused image with the best focus metric is identified as the appropriate focus. The focus motor position for the appropriate focus is selected and the focus motor is automatically driven to the selected focus motor position.

34 Claims, 21 Drawing Sheets

(56) References Cited

U.S. PATENT DOCUMENTS

| | | | |
|---|---|---|---|
| 7,936,392 | B2 | 5/2011 | Ng et al. |
| 7,949,252 | B1 | 5/2011 | Georgiev |
| 8,279,325 | B2 | 10/2012 | Pitts et al. |
| 8,289,440 | B2 | 10/2012 | Knight et al. |
| 8,290,358 | B1 | 10/2012 | Georgiev |
| 2005/0162540 | A1* | 7/2005 | Yata ............... H04N 5/23212 348/345 |
| 2007/0230944 | A1 | 10/2007 | Georgiev |
| 2007/0252074 | A1* | 11/2007 | Ng et al. ............... 250/208.1 |
| 2008/0007626 | A1 | 1/2008 | Wernersson |
| 2008/0122940 | A1* | 5/2008 | Mori ............... H04N 5/23212 348/222.1 |
| 2008/0131019 | A1 | 6/2008 | Ng |
| 2008/0226274 | A1 | 9/2008 | Spielberg |
| 2008/0277566 | A1 | 11/2008 | Utagawa |
| 2009/0128669 | A1 | 5/2009 | Ng et al. |
| 2009/0135258 | A1* | 5/2009 | Nozaki ............... 348/207.99 |
| 2009/0195689 | A1* | 8/2009 | Hwang et al. ............... 348/349 |
| 2009/0310885 | A1* | 12/2009 | Tamaru ............... 382/275 |
| 2010/0026852 | A1 | 2/2010 | Ng et al. |
| 2010/0128145 | A1 | 5/2010 | Pitts et al. |
| 2010/0129048 | A1 | 5/2010 | Pitts et al. |
| 2012/0050562 | A1 | 3/2012 | Perwass et al. |
| 2012/0229691 | A1* | 9/2012 | Hiasa et al. ............... 348/340 |
| 2012/0327222 | A1 | 12/2012 | Ng et al. |
| 2013/0070060 | A1 | 3/2013 | Chatterjee et al. |
| 2013/0113981 | A1 | 5/2013 | Knight et al. |

OTHER PUBLICATIONS

Levoy, M., "Autofocus: Contrast Detection", http://graphics.stanford.edu/courses/cs178/applets/autofocusPD.html, pp. 1-3, 2010.

Levoy, Marc, "Autofocus: Phase Detection", http://graphics.stanford.edu/courses/cs178/applets/autofocusPD.html, pp. 1-3, 2010.

Nayar, Shree, et al., "Shape from Focus", IEEE Transactions on Pattern Analysis and Machine Intelligence, vol. 16, No. 8, pp. 824-831, Aug. 1994.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Raskar, Ramesh et al., "Non-photorealistic Camera: Depth Edge Detection and Stylized Rendering using Multi-Flash Imaging", SIGGRAPH 2004.

Stensvold, M., "Hybrid AF: A New Approach to Autofocus Is Emerging for both Still and Video", Digital Photo Magazine, Nov. 13, 2012.

Autofocus systems and methods (http://en.wikipedia.org/wiki/Autofocus). Retrieved Jan. 2013.

Levin, A., et al., "Image and Depth from a Conventional Camera with a Coded Aperture", SIGGRAPH 2007, pp. 1-9.

Tao, Michael, et al., "Depth from Combining Defocus and Correspondence Using Light-Field Cameras", Dec. 2013.

* cited by examiner

LIGHT-FIELD BASED AUTOFOCUS

CROSS-REFERENCE TO RELATED APPLICATIONS

The present application claims priority as a continuation-in-part of U.S. Utility application Ser. No. 13/774,986 for "Light-Field Processing and Analysis, Camera Control, And User Interfaces and Interaction On Light-Field Capture Devices", filed on Feb. 22, 2013, the disclosure of which is incorporated herein by reference in its entirety.

The present application is related to U.S. Utility application Ser. No. 13/688,026 for "Extended Depth of Field and Variable Center of Perspective in Light-Field Processing", filed on Nov. 28, 2012, the disclosure of which is incorporated herein by reference in its entirety.

The present application is related to U.S. Utility application Ser. No. 13/664,938 for "Light-field Camera Image, File and Configuration Data, and Method of Using, Storing and Communicating Same," filed Oct. 31, 2012, the disclosure of which is incorporated herein by reference in its entirety.

The present application is related to U.S. Utility application Ser. No. 11/948,901 for "Interactive Refocusing of Electronic Images," filed Nov. 30, 2007, the disclosure of which is incorporated herein by reference in its entirety.

FIELD OF THE INVENTION

The present invention relates to systems and methods for light-field based autofocus.

BACKGROUND

Photographic cameras often contain an autofocus mechanism that can determine the optimum focus for a specified object or scene. Optimum focus is the lens position that has the smallest circle of confusion on the image plane for a given object distance. Focusing too far or to near results in a larger circle of confusion. FIG. 1 depicts focusing relative to an image plane. As depicted in FIG. 1, if a lens is focused too near an object (the bottom example) or too far from an object (the top example), the circle of confusion is larger. When a lens is focused correctly (the middle example), the circle of confusion is minimized.

However, there is not a single focus metric that can be used inside a camera to measure distance to a subject. Instead there are a variety of focus metrics used by cameras that rely on different hardware and software configurations. Some cameras use an active autofocus system to measure the distance to a subject. More commonly, cameras use a passive autofocus system to measure distance to a subject.

Passive autofocus systems determine correct focus by performing passive analysis of the image that is entering the optical system. They generally do not direct any energy, such as ultrasonic sound or infrared light waves, toward the subject. An autofocus assist beam, such as infrared light, can be used when there is not enough light to take passive measurements. Passive autofocus systems typically use phase- or contrast-based measurements to determine distance to a subject.

Generally, passive autofocus systems rely on an iterative search; in each iteration, the focus motor is stepped and the focus metric is calculated. Stepping and focus metric calculation is continued until a maximum value for the focus metric is achieved. However, to determine the maximum value for the focus metric, the search must proceed beyond the maximum until the value has begun to decline. The focus motor is then driven back to the maximum value; the system is then at its best focus. FIG. 2 depicts stepping through various focus metric measurements according to the prior art. As shown in FIG. 2, over time, the focus motor position passes maximum focus and is then returned back to maximum focus. Such a technique may take additional time, which can make it more difficult for a photographer to capture quick-moving subjects. In addition, the back-and-forth movement of physical parts can decrease battery life and can introduce unwanted wear-and-tear on components of the camera.

SUMMARY

According to various embodiments, the system and method of the present invention implement light-field based autofocus. In response to receiving a focusing request at a camera, a light-field autofocus system captures a light-field image. A cropped image that contains a region of interest and a specified border is determined. A series of refocused images are generated for the cropped image at different scene depths. A focus metric is calculated for each refocused image. The scene depth of the refocused image with the highest focus metric is identified as the appropriate focus distance. The focus motor position for the appropriate focus distance is selected, and the focus motor is automatically driven to the selected focus motor position.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Definitions

For purposes of the description provided herein, the following definitions are used:

live-view capture: the acquisition of data from one or more sensors at real-time, video, and/or live-view rates, which may occur on a continuous basis and which does not result in the acquired data being stored for later review.

still capture: the acquisition of data as a result of user input, such as for example pressing a shutter button, where the acquired data is transferred or stored for later review.

pre-capture processing or live-view processing: operations that are performed in real-time on acquired live-view data.

post-capture processing: operations that are performed on stored or transferred acquired data, rather than on the real-time live-view acquired data.

captured live-view data: data that is acquired during live-view operation and which may be processed and/or displayed as part of the real-time live-view mode of operation.

captured data: data that is acquired as part of a still capture operation and which may be transferred or stored for later review.

image: a two-dimensional array of pixel values, or pixels, each specifying a color.

light-field image: an image that contains a representation of light-field data captured at the sensor.

microlens: a small lens, typically one in an array of similar microlenses.

refocusable range: the range of scene depths which may be made to appear sharp and "in focus" in generated refocused 2D images for a particular device having particular parameters.

In addition, for ease of nomenclature, the term "camera" is used herein to refer to an image capture device or other image data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for light-field based autofocusing are described. One skilled in the art will recognize that these various techniques and methods can be performed singly and/or in any suitable combination with one another.

Architecture

Figure 3:
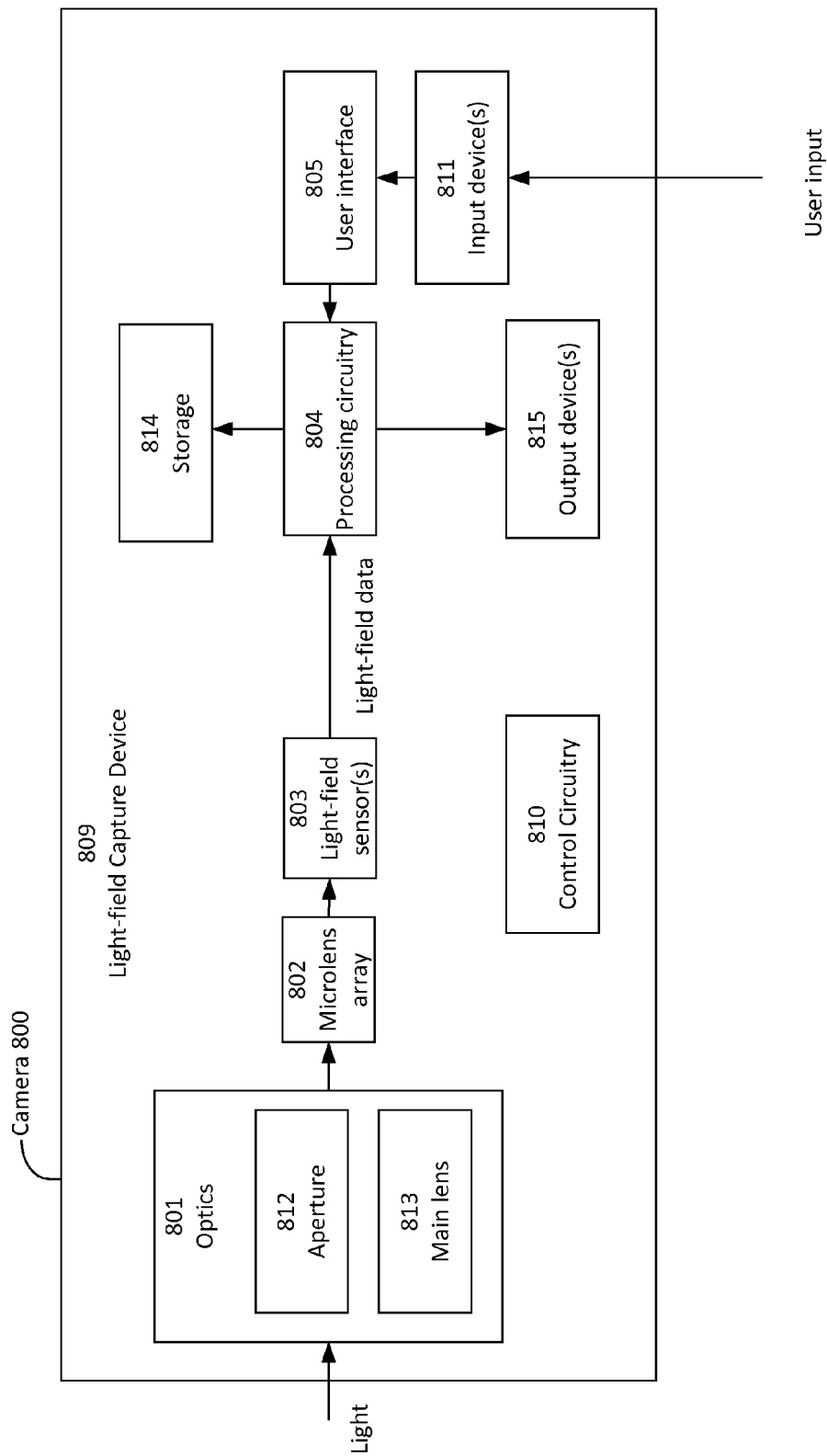
FIG. 3 depicts an example architecture of a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 3, there is shown a block diagram depicting an architecture for implementing the present invention in a light-field camera 800. Examples of light-field camera 800 include (but are not limited to) light-field still and video cameras. One skilled in the art will recognize that the particular configuration shown in FIG. 3 is merely exemplary, and that other architectures are possible for light-field camera 800. One skilled in the art will further recognize that several of the components shown in the configuration of FIG. 3 are optional, and may be omitted or reconfigured.

Figure 4:
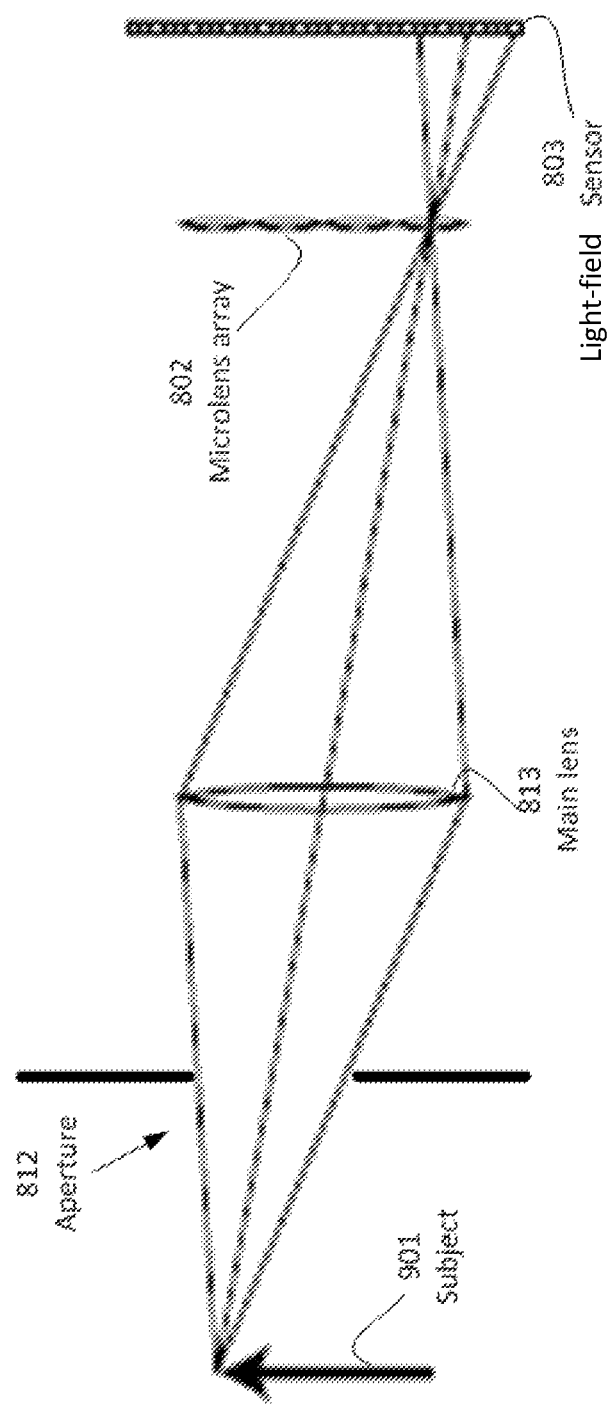
FIG. 4 depicts an example architecture for a light-field capture device for implementing the present invention according to one embodiment.

As shown, light-field camera 800 is one example of a light-field capture device 809; for ease of nomenclature, the terms are used interchangeably, although any suitable light-field capture device 809 can be used in place of camera 800. Light-field capture device 809 includes optics 801, microlens array 802, and image sensor 803 (including a plurality of individual sensors for capturing pixels). Optics 801 may include, for example, aperture 812 for allowing a selectable amount of light into light-field camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring momentarily to FIG. 4, there is shown an example of an architecture for a light-field camera 800 for implementing the present invention according to one embodiment. The Figure is not shown to scale. FIG. 4 shows, in conceptual form, the relationship between aperture 812, main lens 813, microlens array 802, and light-field sensor(s) 803, as such components interact to capture light-field data for subject 901.

Returning to FIG. 3, light-field data from sensor(s) 803 can be processed by processing circuitry 804, and presented as output on output device(s) 815. In at least one embodiment, the output presented at output device(s) 815 can be 2D images or projections of light-field data, as generated by processing circuitry 804.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, captured light-field data is provided to processing circuitry 804. Processing circuitry 804 may be disposed in or integrated into light-field capture device 809 (as shown in FIG. 3), or it may be in a separate component external to light-field capture device 809. Such separate component may be local or remote with respect to light-field image capture device 809. Any suitable wired or wireless protocol can be used for transmitting light-field data to circuitry 804; for example device 809 can transmit light-field data and/or other data via the Internet, a cellular data network, a WiFi network, a BlueTooth communication protocol, and/or any other suitable means.

Generally, processing circuitry 804 operates on light-field data received from light-field sensor(s) 803, to generate any output, such as, for example, still images, 2D video streams, etc. In various embodiments, processing circuitry 804 can use any suitable method of generating still images, 2D images, etc. from light-field data, including (but not limited to) those described below and in related cross-referenced applications.

In at least one embodiment, light-field camera 800 may also include a user interface 805 allowing a user to provide user input for controlling the operation of camera 800 for capturing, acquiring, storing, and/or processing image data. In at least one embodiment, user preferences may also be used, as specified by the user in a preferences screen, or as provided based on defaults. User input can be provided to user interface 805 via any suitable user input device(s) 811 such as a touchscreen, buttons, keyboard, pointing device, and/or the like. As such, input received at input device(s) 811 can be used to control and/or configure either of processing circuitry 804 and control circuitry 810.

In at least one embodiment, camera 800 includes storage devices 814, such as memory for storing image data output from light-field sensor(s) (and potentially processed by processing circuitry 804). The memory can include external and/or internal memory. In at least one embodiment, the memory can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703, 367 for "Light-field Camera Image, File and Configuration Data, and Method of Using, Storing and Communicating Same," filed Feb. 10, 2010, the memory can also store data representing the characteristics, parameters, and/or configurations (collectively "configuration data") of device 809.

Overview

Light-field images often include a plurality of projections (which may be circular or of other shapes) of aperture 812 of camera 800, each projection taken from a different vantage point on camera's 800 focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape.

Figure 5:
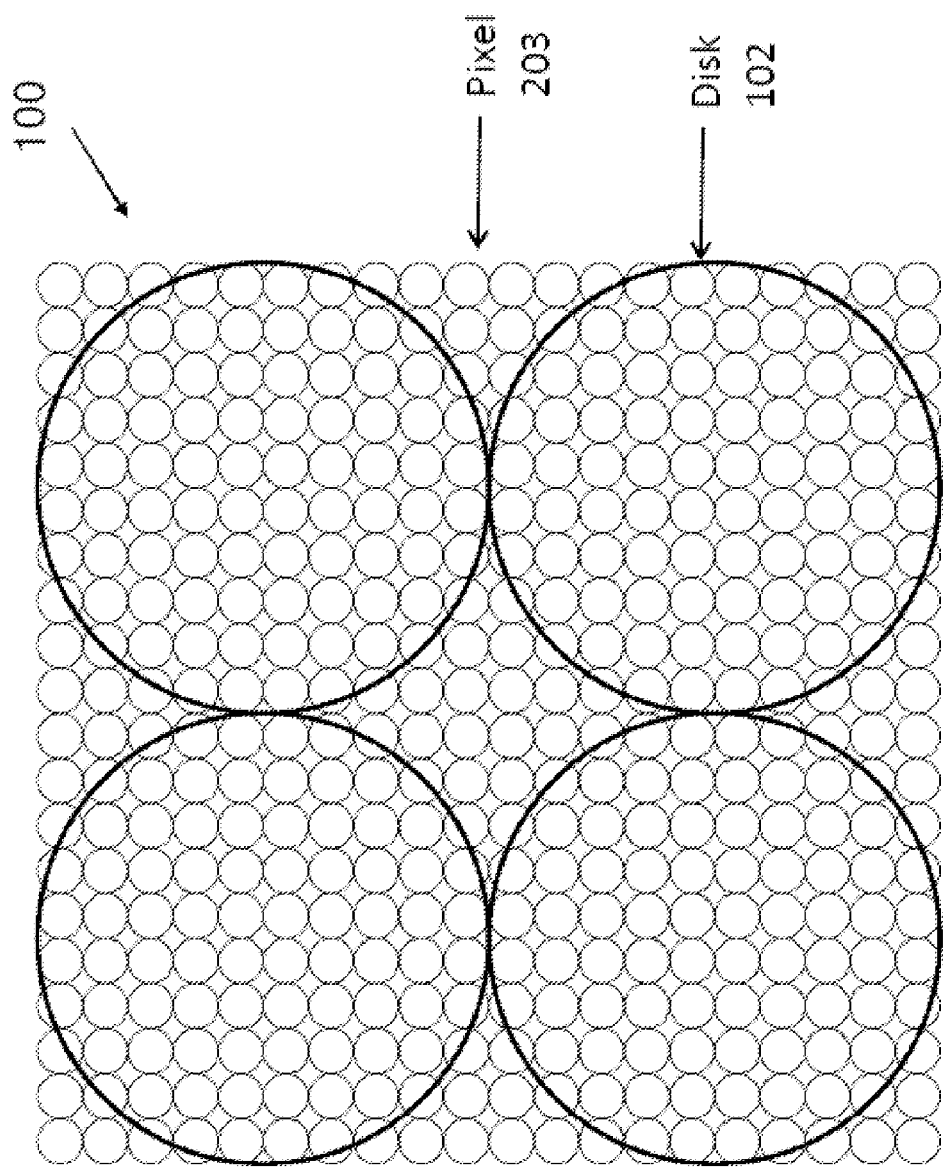
FIG. 5 depicts a portion of a light-field image.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 5, there is shown an example of a 2-disk by 2-disk portion of such a light-field image, including depictions of disks 102 and individual pixels 203; for illustrative purposes, each disk 102 is ten pixels 203 across.

Figure 6:
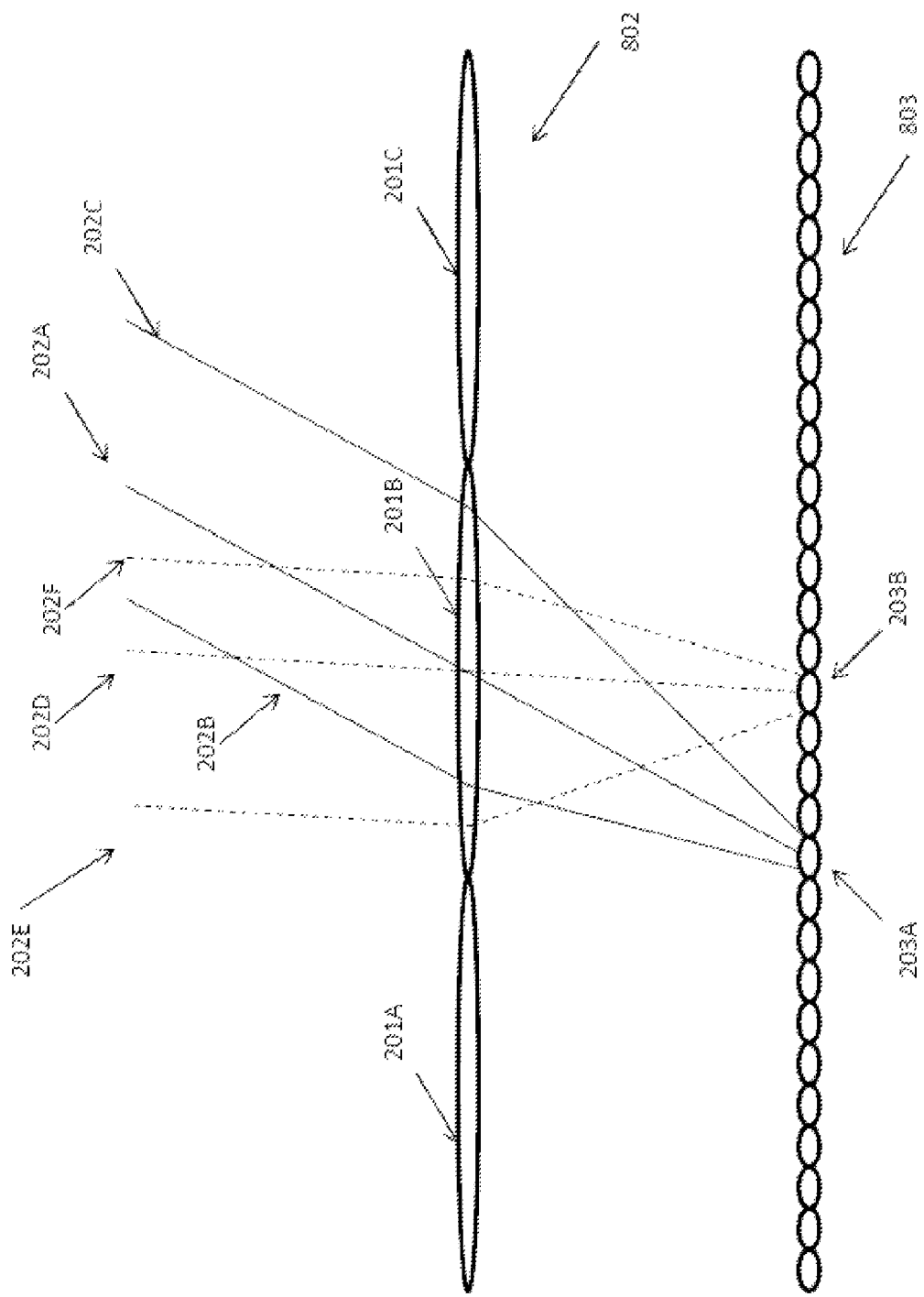
FIG. 6 depicts transmission of light rays through a microlens to illuminate pixels in a digital sensor.

Many light rays in the light-field within a light-field camera contribute to the illumination of a single pixel 203. Referring now to FIG. 6, there is shown an example of transmission of light rays 202, including representative rays 202A, 202D, through microlens 201B of array 802, to illuminate sensor pixels 203A, 203B in sensor 803.

In the example of FIG. 6, solid rays 202A, 202B, 202C illuminate sensor pixel 203A, while dashed rays 202D, 202E, 202F illuminate sensor pixel 203B. The value at each sensor pixel 203 is determined by the sum of the irradiance of all rays 202 that illuminate it. For illustrative and descriptive purposes, however, it may be useful to identify a single geometric ray 202 with each sensor pixel 203. That ray 202 may be chosen to be representative of all the rays 202 that illuminate that sensor pixel 203, and is therefore referred to herein as a representative ray 202. Such representative rays 202 may be chosen as those that pass through the center of a particular microlens 201, and that illuminate the center of a particular sensor pixel 203. In the example of FIG. 6, rays 202A and 202D are depicted as representative rays; both rays 202A, 202D pass through the center of microlens 201B, with ray 202A representing all rays 202 that illuminate sensor pixel 203A and ray 202D representing all rays 202 that illuminate sensor pixel 203B.

Figure 7:
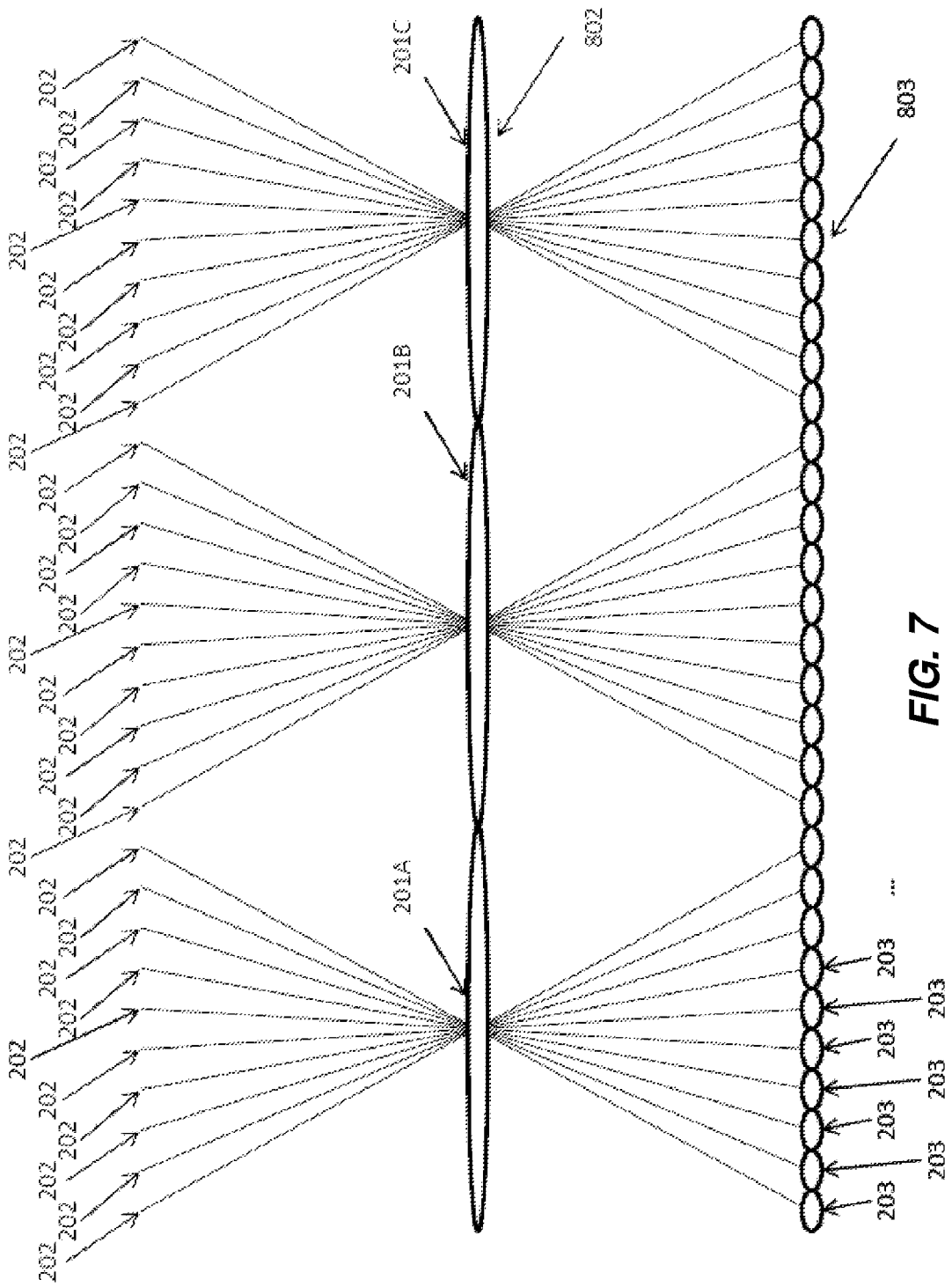
FIG. 7 depicts an arrangement of a light-field capture device wherein a microlens array is positioned such that images of a main-lens aperture, as projected onto the digital sensor, do not overlap.

There may be a one-to-one relationship between sensor pixels 203 and their representative rays 202. This relationship may be enforced by arranging the (apparent) size and position of main-lens aperture 812, relative to microlens array 802, such that images of aperture 812, as projected onto sensor 803, do not overlap. Referring now to FIG. 7, there is shown an example of an arrangement of a light-field capture device, such as camera 800, wherein microlens array 802 is positioned such that images of a main-lens aperture 812, as projected onto sensor 803, do not overlap. The rays 202 depicted in FIG. 7 are representative rays 202, as they all pass through the center of one of microlenses 201 to the center of a pixel 203 of light-field sensor 803.

Figure 8:
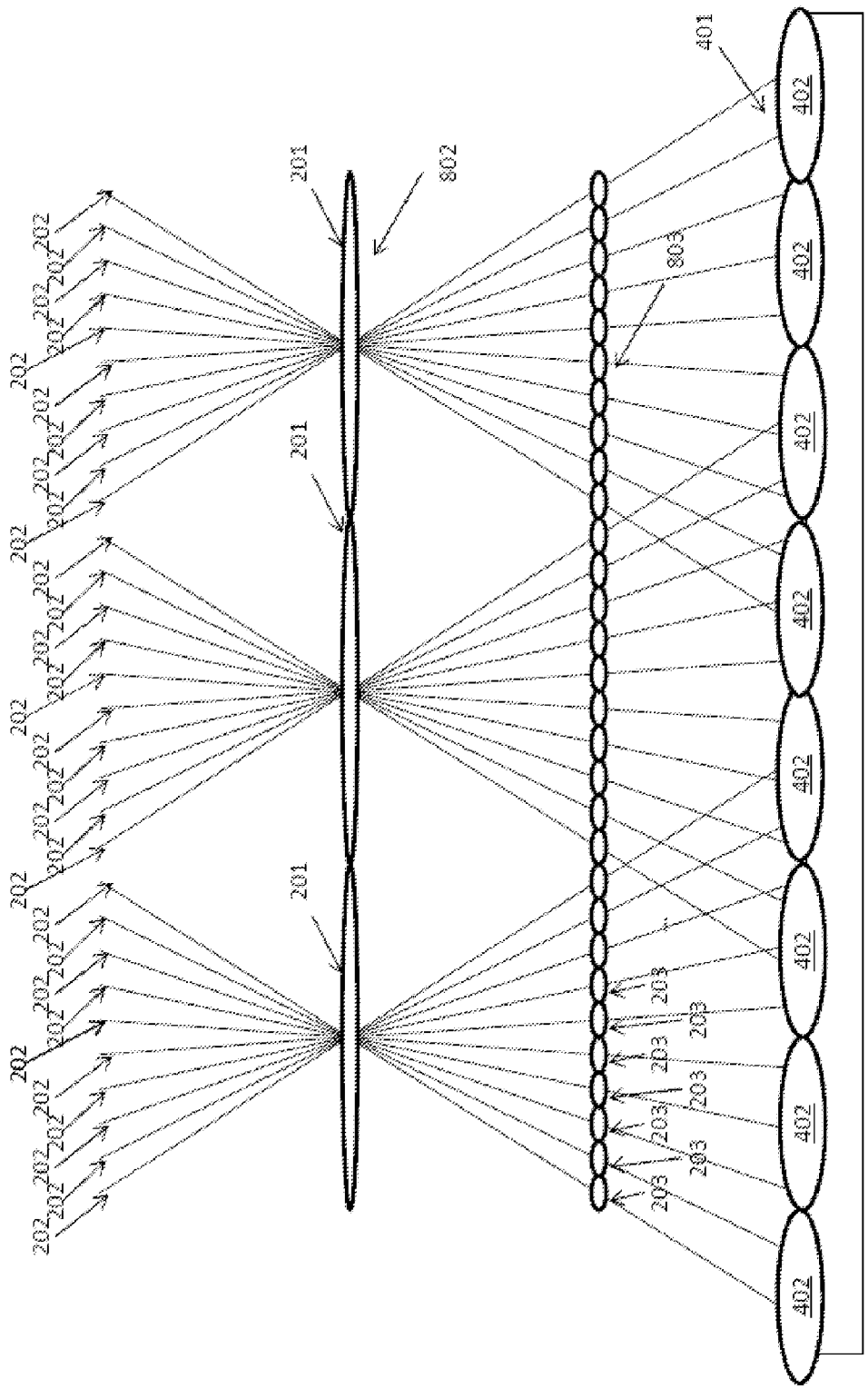
FIG. 8 depicts an example of projection and reconstruction to reduce a 4-D light-field representation to a 2-D image.

In at least one embodiment, the 4-D light-field representation may be reduced to a 2-D image through a process of projection and reconstruction. Referring now to FIG. 8, there is shown an example of such a process. A virtual projection surface 401 may be introduced, and the intersection of each representative ray 202 with projection surface 401 is computed. Projection surface 401 may be planar or non-planar. If planar, it may be parallel to microlens array 802 and sensor 803, or it may not be parallel. In general, projection surface 401 may be positioned at any arbitrary location with respect to microlens array 802 and sensor 803. The color of each representative ray 202 may be taken to be equal to the color of its corresponding pixel. In at least one embodiment, pixels 203 of sensor 803 may include filters arranged in a regular pattern, such as a Bayer pattern, and converted to full-color pixels. Such conversion can take place prior to projection, so that projected rays 202 can be reconstructed without differentiation. Alternatively, separate reconstruction can be performed for each color channel.

The color of an image pixel 402 on projection surface 401 may be computed by summing the colors of representative rays 202 that intersect projection surface 401 within the domain of that image pixel 402. The domain may be within the boundary of the image pixel 402, or may extend beyond the boundary of the image pixel 402. The summation may be weighted, such that different representative rays 202 contribute different fractions to the sum. Ray weights may be assigned, for example, as a function of the location of the intersection between ray 202 and projection surface 401, relative to the center of a particular pixel 402. Any suitable weighting algorithm can be used, including for example a bilinear weighting algorithm, a bicubic weighting algorithm and/or a Gaussian weighting algorithm.

During projection to a refocused 2-D image, representative rays 202 are intersected with virtual projection surface 401 that is parallel to microlens array 802, but displaced from it. If virtual projection surface 401 is ahead of microlens array 802 (nearer to the scene), then the reconstructed 2-D image is focused at a virtual projection surface 401 that is ahead of the best focus scene plane of the light-field camera 800. (It is farther from the light-field camera 800.) Likewise, if virtual projection surface 401 is behind microlens array 802 (farther from the scene) then the reconstructed 2-D image is focused at a virtual projection surface 401 that is behind the best-focus scene plane of the light-field camera 800. Objects in the scene whose scene depths correspond to the image depth of virtual projection surface 401 are in essentially exact focus; other objects in the scene are projected with blur that increases with their displacement from that scene depth.

A depth map is a set of image-side points (points on the image side of main lens 813), each of which corresponds to a visible point in the scene. A point in the scene is visible if light emitted from it reaches the anterior nodal point of main lens 813, either directly or by being reflected from a highly specular surface. The correspondence is such that light emitted from the scene point would be in best focus by main lens 813 at the corresponding image-side point.

The position of an image-side point in a depth map may be specified in Cartesian coordinates, with x and y indicating position as projected onto light-field sensor(s) 803 (x positive to the right, y positive up, when viewing toward the scene along the optical axis of main lens 813), and depth d indicating perpendicular distance from the surface of microlens array 802 (positive toward the scene, negative away from the scene). The units of x and y may be pixels—the pixel pitch of sensor 803. The units of d may be lambdas, where a distance of one lambda corresponds to the distance along which a cone of light from any scene point changes its diameter by a value equal to the pitch of microlens array 802. (The pitch of microlens array 802 is the average distance between the centers of adjacent microlenses 201.)

Thus, for scene-side points that are directly visible to main lens 813, points at scene depths on the plane of the optical focus correspond to an image depth at the (microlens) surface. Points at scene depths that are farther from light-field camera 800 than the plane of best focus correspond to points with image depths that are closer to main lens 813 than the plane of best focus. As such, points at scene depths that are farther from light-field camera 800 than the plane of best focus have positive depth values. Points at scene depths that are nearer to camera 800 than the plane of best focus correspond to points with image depths that are further from main lens 813 than the plane of best focus. As such, points at scene depths that are nearer to camera 800 than the plane of best focus have negative depth values.

Light-field Based Autofocus

In some embodiments, the present invention relates to methods, systems, algorithms, designs, and user interfaces for controlling the optics of a light-field capture device 809 to aid the user in successfully composing and capturing light-field data of a scene such that the light-field data may be used to generate 2D output images that encompass the scene objects of interest and that present such objects of interest in focus. For example, a set of generated 2D refocused images can be generated that contains 2D refocused images at different depths. Focus metrics can be calculated for each 2D refocused image. The depth associated with the 2D refocused image having the highest focus metric is used to set a new focus motor position.

Figure 9:
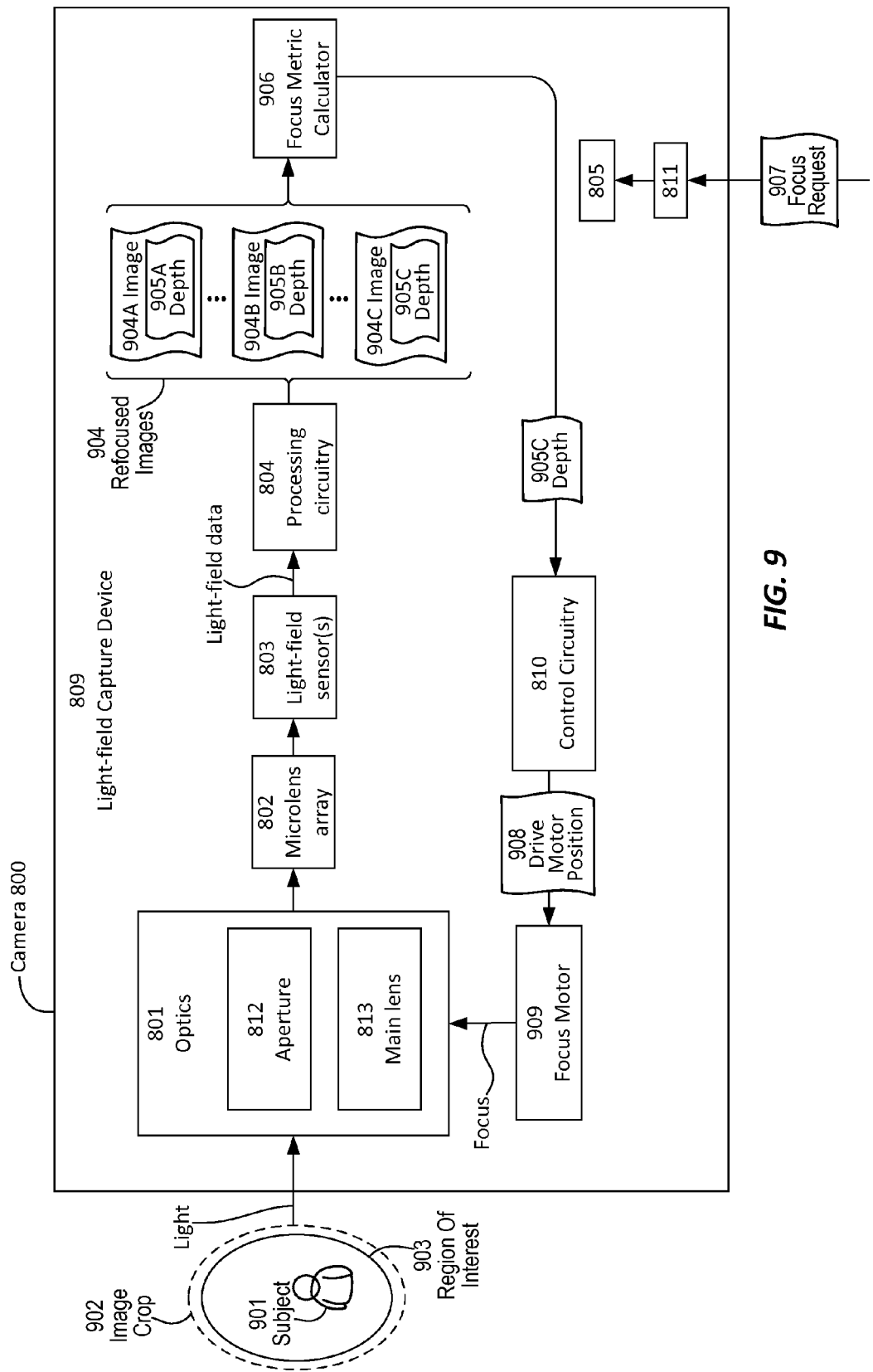
FIG. 9 depicts another example architecture of a light-field capture device, according to one embodiment.

Referring now to FIG. 9, there is shown another example architecture for light-field camera 800. As depicted, optics 801 collects light from image crop 902. Image crop 902 includes subject 901 within region of interest 903. The collected light travels through microlens array 802 to light-field sensor(s) 803. At light-field sensor(s) 803, the light is converted to light-field data. Processing circuitry 804 processes the light-field data to generate a series of cropped refocused images 904 at various different scene depths.

Focus metric calculator 906 is configured to assign a focus metric to each image in cropped refocused images 904. The scene depth of the refocused image with the highest focus metric can be determined to be the appropriate (or "best") focus. Focus metric calculator 906 can send the scene depth associated with the appropriate (or "best") focus to control circuitry 810. Control circuitry 810 can select a drive motor position for the appropriate (or "best") focus scene depth. Focus motor 909 can then be driven to the driver motor position to focus optics 801. Once optics 801 are in focus, a 2D image can be captured that includes subject 901 in proper focus.

Any of a variety of known focus metrics can be used, either singly or in any suitable combination. Techniques for assigning and/or calculating focus metrics can be based on maximizing sharpness and therefore the gradient of the area of interest, and/or on measuring the amount of high frequency content in the area of interest. In general, a focus function used to calculate a focus metric can be obtained from some measure of the high frequency content in an output image. Focus functions can be based on differentiation. For example, when an image is digitized, an approximation can be obtained by a first- or second-order difference (e.g., absolute gradient, threshold absolute gradient, squared gradient, etc.). Focus functions can be based on depth of peaks and valleys (e.g., threshold video-signal count, threshold video-signal pixel count, signal power, etc.). Focus functions can be based on image contrast (e.g., variance, normalized variance, absolute variation, normalized absolute variation, etc.). A variety of autofocus metrics and algorithms are described in Groen et al., "A Comparison of Different Focus Functions for Use in Autofocus Algorithms".

Figure 10:
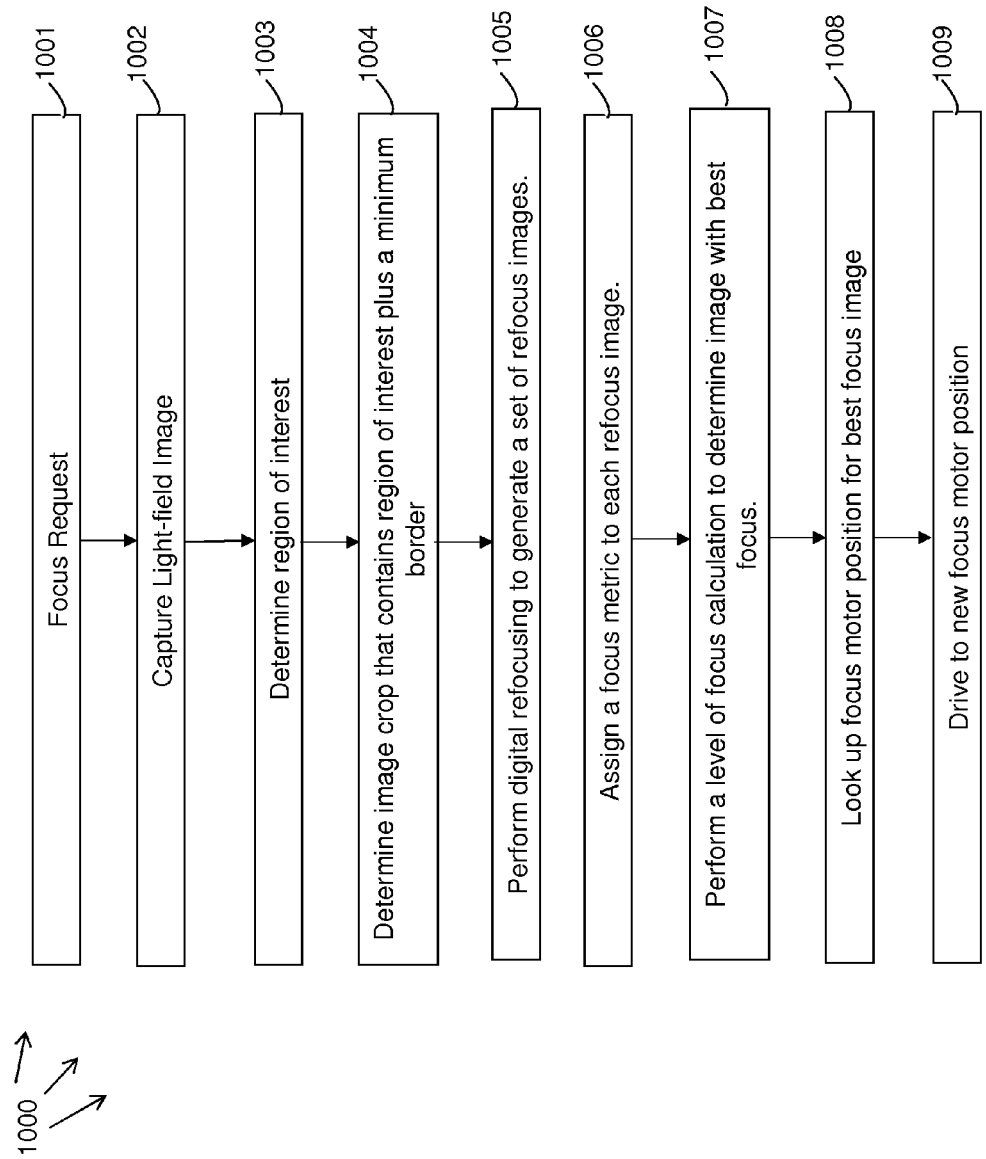
FIG. 10 is a flow diagram depicting an example of a method for focusing a lens based on a light-field, according to one embodiment.

Referring now to FIG. 10, there is shown an example of a method 1000 for focusing a lens based on a light-field. The method 1000 will be described with respect to the components in FIG. 9.

A focus request is received 1001. In some embodiments, the focus request is generated internally by the components of light-field camera 800. In other embodiments, a user can enter a focus request. For example, a user can submit focus request 907 through input device(s) 811 to user interface 805; alternatively, a user can trigger a focus request by pressing a shutter button halfway down.

In response to the focus request, a light-field image is captured 1002. For example, camera 800 can capture a light-field image including subject 901 (and represented by the light-field data output by light-field sensor(s) 803. A region of interested is determined 1003. For example, processing circuitry 804 can identify region of interest 903. A crop region that contains the region of interest plus a minimum border can be identified 1004. For example, processing circuitry 804 can identify image crop 902 that includes region of interest 903 plus a border.

Digital refocusing can be performed to generate a set of refocus images 1005. For example, processing circuitry 804 can generate refocused images 904. As depicted, refocused images 904 includes images 904A, 904B, 904C, etc. Each of images 904A, 904B, 904C, etc., can be generated at different scene depths. For example, images 904A, 904B, and 904C can be generated at scene depths 905A, 905B, and 905C respectively.

A focus metric is assigned to each refocus image 1006. For example, focus metric calculator 906 can assign a focus metric to each of images 904A, 904B, 904C, etc. As described, any of a variety of different focus functions can be used to calculate a focus metric. Thus, focus metric calculator 906 can implement a focus function when calculating focus metrics. A level of focus calculation is performed to determine the image with the best focus 1007. For example, focus metric calculator can perform a level of focus calculation to determine that image 904C has the best focus metric. In response, depth 905C can be sent to control circuitry 810.

A focus motor position for the best focus image is looked up 1008. For example, control circuitry 810 can look up drive motor position 908 as corresponding to depth 905C (i.e., the scene depth of the refocus image with the best focus metric). A drive motor is driven 1009 to a new focus motor position. For example, control circuitry 810 can send drive motor position 908 to focus motor 909 to drive focus motor 909 to a new position. The new position focuses optics 801 to depth 905C. A 2D image can then be taken at that focus depth.

Figure 1:
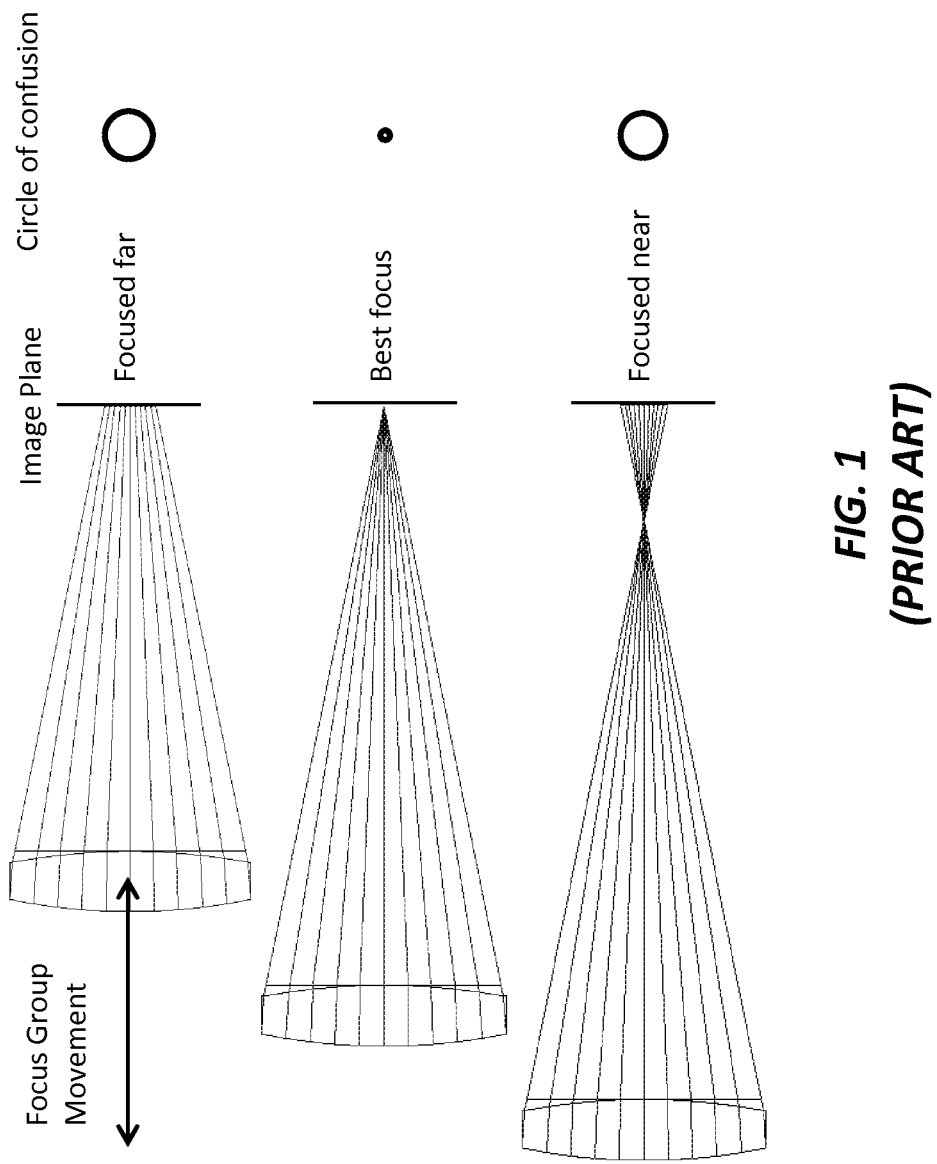
FIG. 1 depicts examples of focusing a lens on an object according to the prior art.
Figure 2:
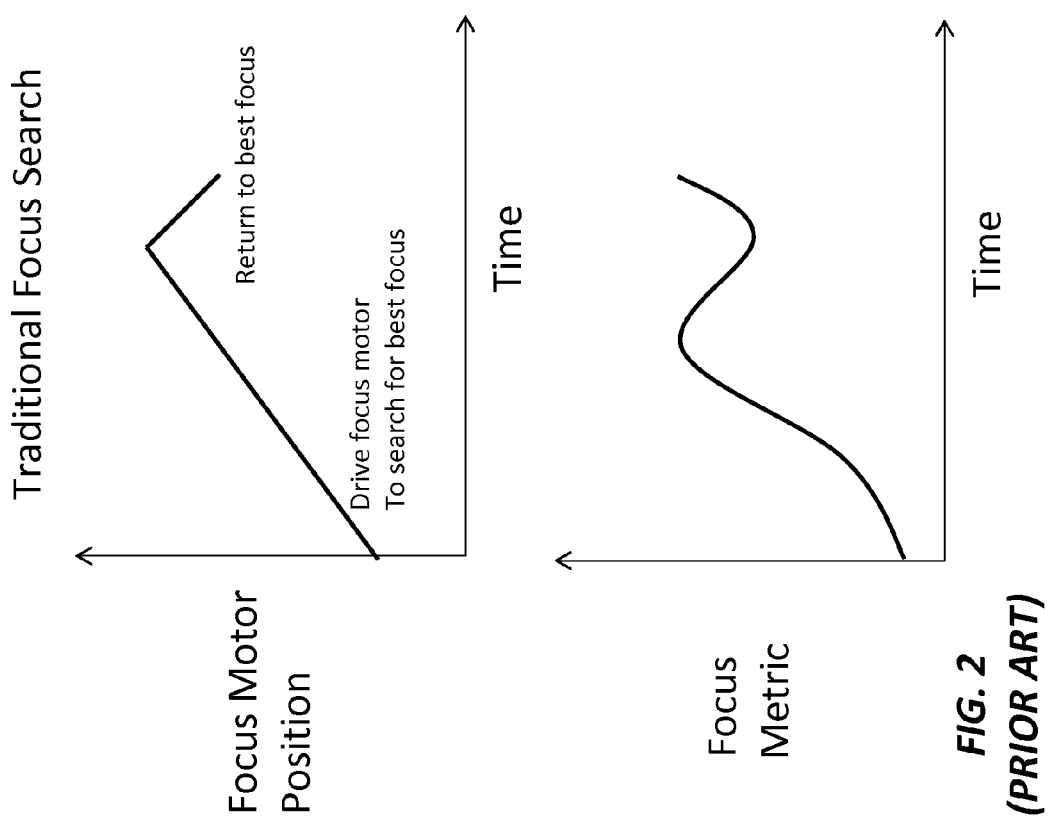
FIG. 2 depicts an example of focus motor position over time when finding a maximum focus metric, according to the prior art.
Figure 13:
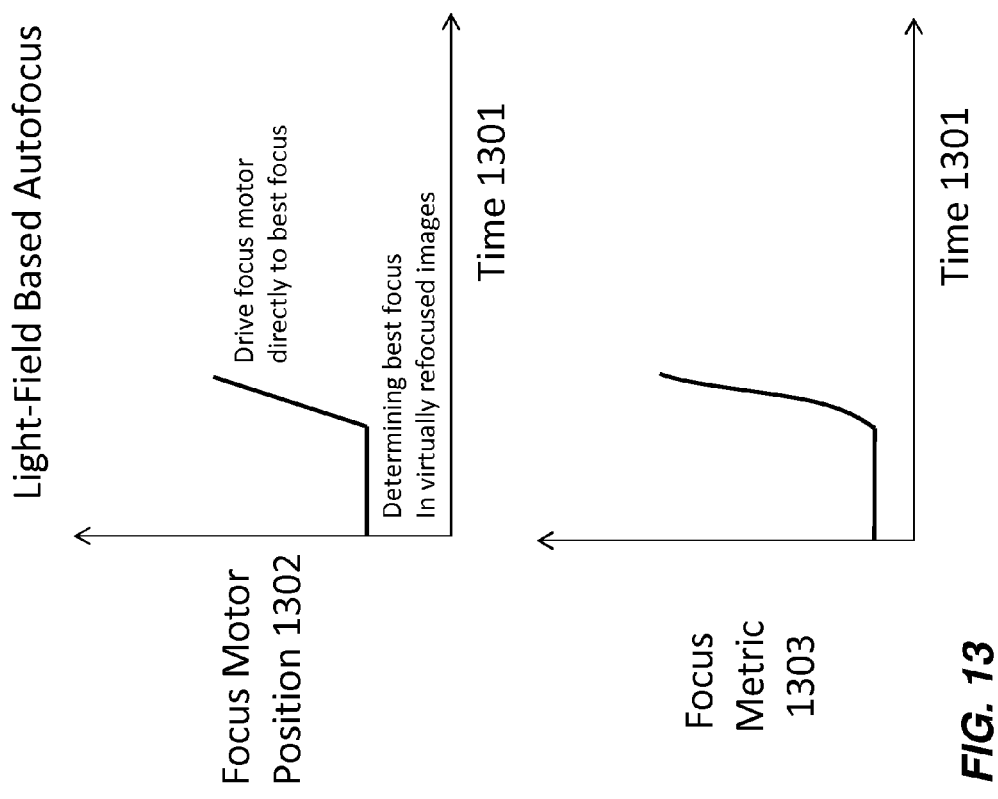
FIG. 13 depicts an example of focus motor position over time when finding a maximum focus metric according to the light-field based autofocus method of an embodiment of the present invention.

As shown in FIG. 13 (and in contrast to FIG. 2), embodiments of the invention can be used to move a drive focus motor position directly to the best focus. The top portion of FIG. 13 depicts focus motor position 1302 as a function of time 1301; here, using the techniques of the present invention, focus motor 909 moves optics directly to the best focus location, avoiding the iterative back-and-forth of prior art systems. The bottom portion of FIG. 13 depicts focus metric 1303 as a function of time 1301. The techniques of the present invention thus provide a more efficient mechanism for autofocus than is found in the prior art, and avoids the limitations and shortcomings of prior art schemes as discussed above.

Depth Space Intervals

Figure 11:
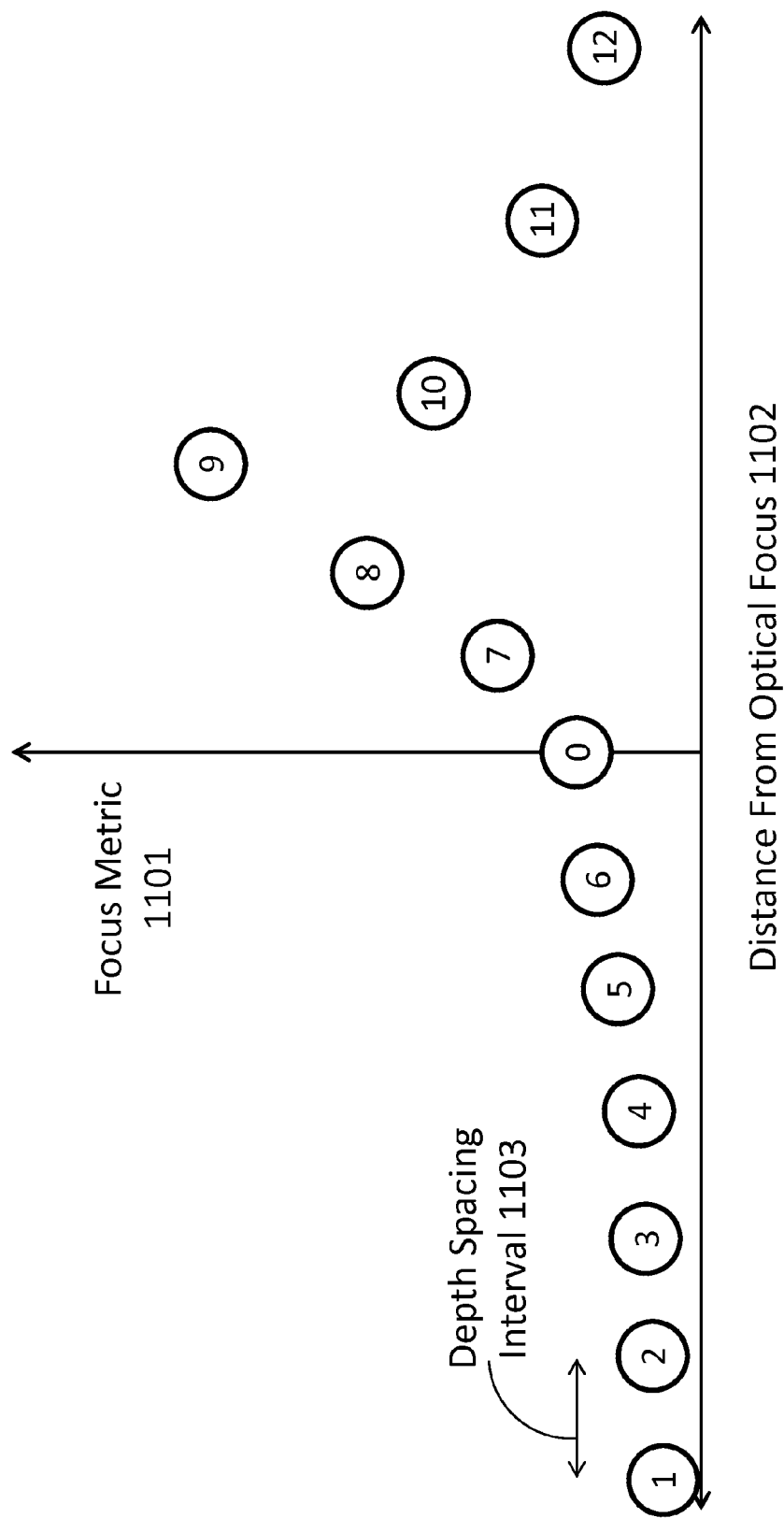
FIG. 11 is an example graph of focus metrics for different scene depths.

As shown in FIG. 11, in at least one embodiment, the depth spacing interval of the refocused images is chosen such that it is no greater than the depth of focus of the current camera configuration. FIG. 11 depicts values for focus metric 1101 at different distances from optical focus 1102 on either side of optical focus. A value for focus metric 1101 is determined for a variety of positions 0-12. Each position is separated from the prior position by depth spacing interval 1103 (with the exception of position 0, which is at optical focus). As depicted, position 9 has a maximum value for focus metric 1101.

Figure 12:
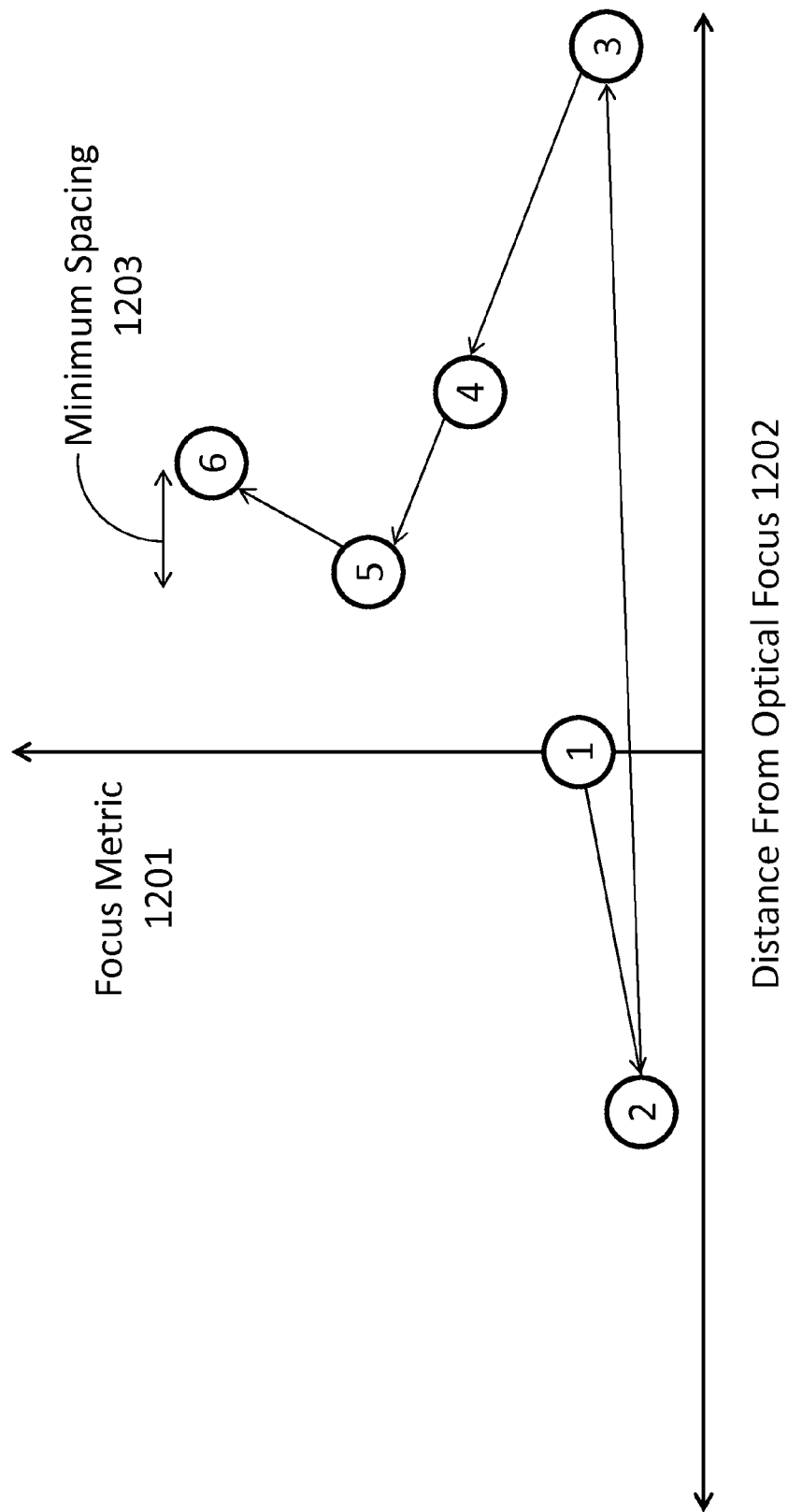
FIG. 12 is an example graph of focus metrics for different scene depths.

In at least one embodiment, a sweep of the entire refocusable depth can be used to determine best focus. Alternatively, to reduce the number of refocused images to be calculated, an iterative search can be used. FIG. 12 depicts values for focus metric 1201 at different distances form optical focus 1202 on either side of optical focus. A value for focus metric 1201 is determined for a variety of positions 1-6. The iterative search starts with larger steps in focus depth and then converges on the best focus by using increasingly smaller spacing in focus depth, down to minimum spacing 1203. As depicted, the maximum value is found after 6 increments in the search.

Variations

Figure 14:
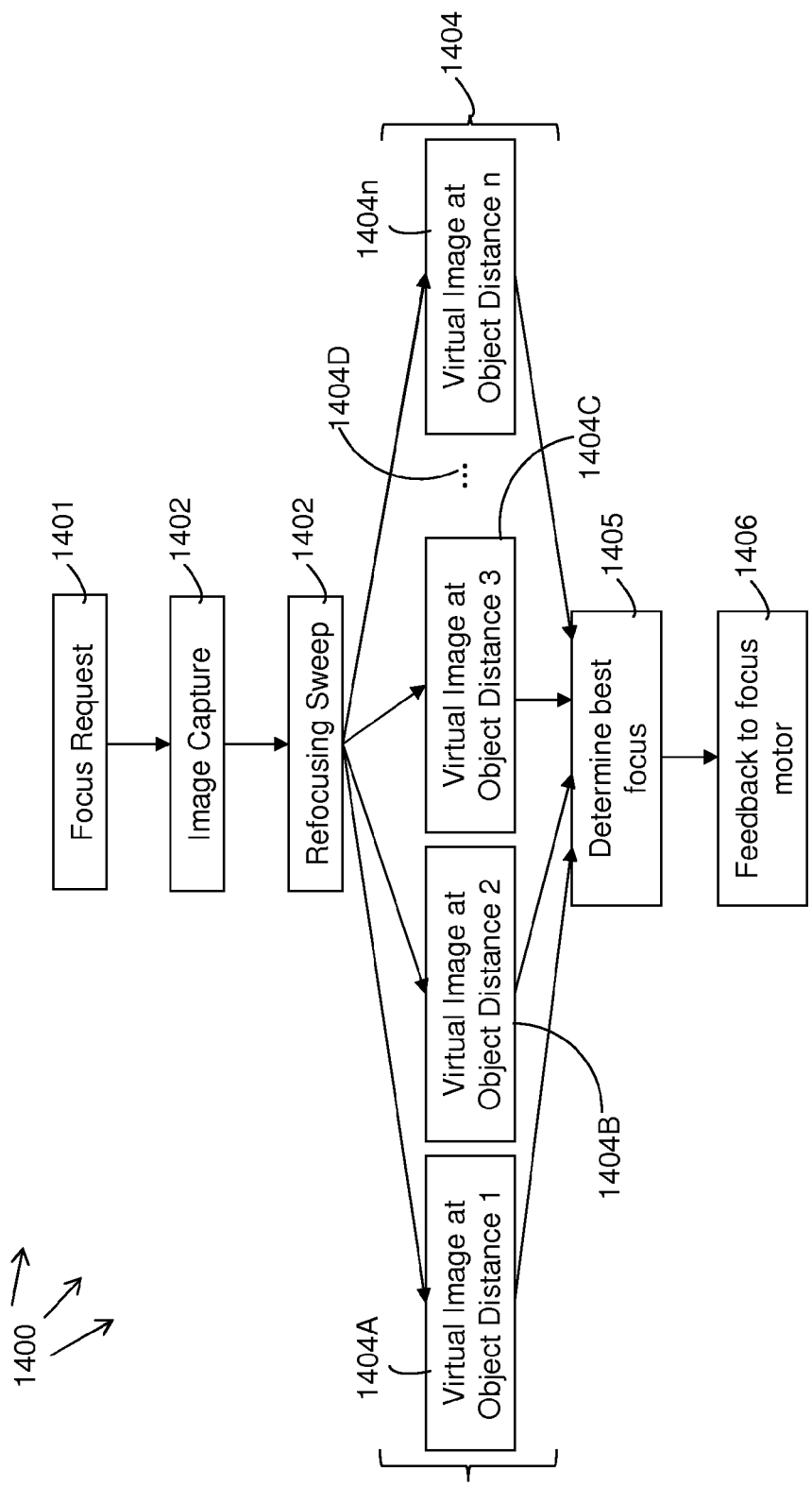
FIG. 14 is a flow diagram depicting another example of a method for focusing a lens based on a light-field, according to one embodiment.

Referring now to FIG. 14, there is shown another example of a method 1400 for focusing a lens using captured light-field images. The method 1400 will be described with some reference to the components in FIG. 9.

A focus request is received 1401. Similar to method 1000, the focus request can be generated internally by the components of light-field camera 800. In other embodiments, a user can enter a focus request. For example, a user can submit focus request 907 through input device(s) 811 to user interface 805; alternatively, a user can trigger a focus request by pressing a shutter button halfway down. In response to the focus request, a light-field image is captured 1402. For example, similar to method 1000, camera 800 can capture a light-field image including subject 901 (and represented by the light-field data output by light-field sensor(s) 803.

A refocusing sweep is performed 1403. For example, processing circuitry 803 and focus metric calculator 906 can perform a refocusing sweep of light-field data received from light-field sensors 803. A refocusing sweep can include generating a virtual image from the light-field data at various different object distances 1404. For example, processing circuitry 803 and focus metric calculator 906 can generate a virtual image at object distance 1 1404A. Processing circuitry 803 and focus metric calculator 906 can generate a virtual image at object distance 2 1404B. Processing circuitry 803 and focus metric calculator 906 can generate a virtual image at object distance 3 1404C. Ellipsis 1404D represents that processing circuitry 803 and focus metric calculator 906 can generate any number of other virtual images at other object distances. Processing circuitry 803 and focus metric calculator 906 can generate a virtual image at object distance n 1404N. As such, virtual images can be generated at object distances 1 through object distance n.

The virtual image having the best focus is determined 1405. For example, focus metric calculator 906 can determine the best focused image from among the virtual images at object distances 1 through n. Feedback is then provided to the focus motor 1406. For example, control circuitry 810 can send focus motor 909 commands to move the focus motor position. The focus motor position can then be moved to set optics 801 to focus at the object distance corresponding to the virtual image with the best focus. A 2D image can then be taken at that focus depth.

Focus Area Selection

In at least one embodiment, when a scene to be imaged includes objects at multiple depths, camera 800 may determine which of the depths is to be in focus, either automatically or in response to user input. A single point in the scene may be used to determine best focus. Any suitable method can be used for identifying the point. For example, camera 800 may identify the center of the image or a point automatically selected by face recognition, scene analysis, and/or any other suitable technique. Alternatively, the user may specify the point to be used, for example by providing a touch input, In yet another embodiment, a position of best focus is chosen based on a weighting of many different points in the scene. Specific techniques for determining where to focus are described in related application Utility application Ser. No. 13/774,986 for "Light-Field Processing and Analysis, Camera Control, And User Interfaces and Interaction On Light-Field Capture Devices", filed on Feb. 22, 2013, the disclosure of which is incorporated herein by reference in its entirety.

In at least one embodiment, for single point focus positions, refocused images for a small section of the image can be generated centered on the region of interest.

Light-field Processing

Generally, embodiments of the invention relate to controlling the optics of a light-field capture device to aid a user in successfully composing and capturing light-field data of a scene such that the light-field data may be used to generate 2D output images that encompass the scene objects of interest, and that present such object of interest in focus. For example, a set of generated 2D refocused images can be generated that contains 2D refocused images where the subject(s) of interest in the scene are sharp and appear in focus.

Components of a light-field capture device (e.g., light-field capture device 809) can process light-field data to generate refocused images. Data captured by light-field capture devices 809 contains information from which scene depths may be inferred or measured, and the range of depths captured in a scene is related to the set of possible 2D images which may be rendered from (or projected from) the captured light-field data. The "amount of refocusing" that is possible from a captured set of light-field data is, in general, proportional to the dioptric range of scene depths that were captured.

Light-field data acquired by light-field sensor(s) (e.g., light-field sensor(s) 803) may be processed in any of a number of different ways in order to generate 2D images. Various embodiments of the present invention can process data acquired at a video-rate (such as 30 frames per second) from light-field sensor(s) 803 to generate one or more video-rate 2D image streams for display on light-field capture device 809 itself (such as on one or more LCD screens or other output device(s) 815) and/or outputting over external interfaces (such as HDMI ports). In particular, the 2D image stream may be used as a live-view image stream on the device's LCD screen, so that the 2D image stream displayed is generated in real-time from the light-field data being acquired. Each 2D image in the generated image stream(s) may feature one or more of the following aspects:

The 2D image may be refocused to a particular scene depth, and the scene depth to which it is refocused may be the same as or different from the scene depth which is optically in focus.

The 2D image may be refocused to an arbitrary focus surface, for example to simulate a tilt/shift lens.

In at least one embodiment, the decisions as to what processing to apply to the light-field data stream to produce the 2D output image stream(s) are made automatically (and transparently to the user). In at least one other embodiment, these decisions are made in conjunction with user input or direction. Exemplary embodiments of methods for making these decisions under the guidance or direction of the user include (but are not limited to) the following:

The user may indicate his or her subject or region of interest by providing input via input device(s) 811; this may include, for example, touching the screen or performing any other action(s) detectable by input device(s) 811. Input device(s) 811 may be of any suitable type, so as to enable techniques such as eye-tracking, stylus gesture input, voice commands, and/or the like. The light-field data is refocused to generate a 2D image stream that gives the appearance of bringing the corresponding subject or region (as designated by the user input) into focus.

The user may specify via touchscreen or other input that the light-field data should be refocused to a particular depth, for example the closest or furthest distance that can be brought sharply into focus, so as to generate a 2D image stream that gives the appearance of bringing that subject or region into focus.

The processing used to generate each image in the output 2D image stream may change over time, including on a per-frame basis. In at least one embodiment, the processing is gradually changed over time so that the 2D image stream appears to animate smoothly as different effects are rendered, without noticeable discontinuities in the characteristics of the image stream. Examples of such animations include (but are not limited to) the following:

Gradually changing the depth of the refocus operation, so that the 2D image stream appears to change its focus over time; this effect can give the appearance of physically changing the focus on a conventional 2D camera.

The parameters chosen for the generated 2D image stream animations may be chosen to be extremal, such that the resultant animations reflect the maximum capabilities of the acquired light-field data. For example, the animation may refocus between the closest and furthest scene depths which can be sharply brought into focus, or may shift the perspective center between the leftmost and rightmost virtual aperture positions. Such animations of the live-view image stream can convey information to the user about the capabilities of the light-field data being captured.

Analyzing Light-field Data and Communicating Scene and Light-field Data Characteristics to the User In various embodiments, the system and method of the present invention include mechanisms for analyzing captured live-view light-field data, and then in real time communicating information about the light-field data characteristics and the scene being imaged to the user of light-field capture device 809.

Light-field data provides the capability for the determination of the depths of scene objects. In at least one embodiment, such depth analysis is performed on the captured live-view light-field data stream, at live-view/video rates; this depth information is then used to aid the user in composing and capturing light-field data.

For example, in at least one embodiment, the live-view 2D image stream that is displayed on output device(s) 815 can be modified to incorporate depth cues. This can be done, for example, by any of the following techniques:

Overlaying a depth map on top of the live-view 2D image stream. The depth map may be semi-transparent and blended with the live-view images, or it may be opaque and replace them entirely.

Filtering the live-view 2D image stream such that each pixel is processed based on its depth and/or on the depth of its local region to change the brightness or color of the pixel in a depth-dependent manner. For example, the intensity and/or color of pixels can be changed depending on whether the corresponding scene locations are within or not within the light-field data's refocusable range. For example, scene locations outside the range may be "grayed out".

In at least one embodiment, text, graphics, icons, figures, and/or any other annotations or indicators are drawn on top of or alongside the live-view 2D image stream display, so as to communicate information about the scene or about the light-field data characteristics. For example, certain scene features can be labeled with a numeric score or a text or graphic label, to indicate their relative depth in the scene. Any suitable label can be presented, so as to describe or indicate whether a given scene object is within the refocusable range of the light-field data.

In at least one embodiment, only portions of the light-field display the visual cues described above. This allows for implementation on a device having limited processing power, where it might be unfeasible to process full-resolution images at video frame-rates. The portion of the image to be processed in this manner may be automatically determined by camera 800 or selected by the user.

In at least one embodiment, non-visual cues can be used to communicate depth and/or scene information to the user. For example a sound can be played, or device 809 can vibrate, based on the refocusable range of the captured light-field data.

Any or all of the above techniques can be activated on demand. For example, in at least one embodiment, the visual cues are shown when the user depresses a two-stage shutter button half-way; the live view is then altered as described above. Fully depressing the shutter button then captures and stores the light-field data. Other methods of toggling the visual cues on or off can be used, including those methods that incorporate other sensors on device 809, such as accelerometers, microphones, and/or other buttons.

Any of the above techniques can be performed on a captured light-field picture or video stream. In at least one embodiment, such techniques can be performed in a manner that displays more processing-intensive light-field quality metrics that cannot be computed in real-time.

In at least one embodiment, the techniques described herein are applied to a display being presented on other devices than device 809, such as computers, tablets, or phones that receive image data from device 809.

Implementation of Depth Analysis Using Light-field Data

Light-field data can be used to generate multiple different perspective views of the same scene (as described in Ng et al.); other methods may be known in the art for calculating depth information from perspective views of a scene. Any such method may be employed in conjunction with the present invention to use depth information to communicate scene information and/or light-field data characteristics to the user. In at least one embodiment, depth information is computed for every point in the scene; in another embodiment, it may only be computed within certain regions and/or for certain scene features.

Camera Control for Composition and Capture of Light-field Data

In light-field capture devices 809 with movable optics, for example a main lens 813 with variable zoom and focus controlled by zoom and focus motors, the capabilities of the captured light-field data with respect to the set of 2D images of the scene that may be generated from it may be dependent in part upon the positions and/or configurations of the moving optical elements. For example, referring now to FIGS. 15A and 15B, there is shown an example of the relationship between the position of focal plane 504 (as determined by the focus position of main lens 813) and the refocusable range of the captured light-field data, according to one embodiment. "Refocusable range" refers to the range of scene depths which may be made to appear sharp and "in focus" in generated refocused 2D images for a particular device having particular parameters.

Figure 15A:
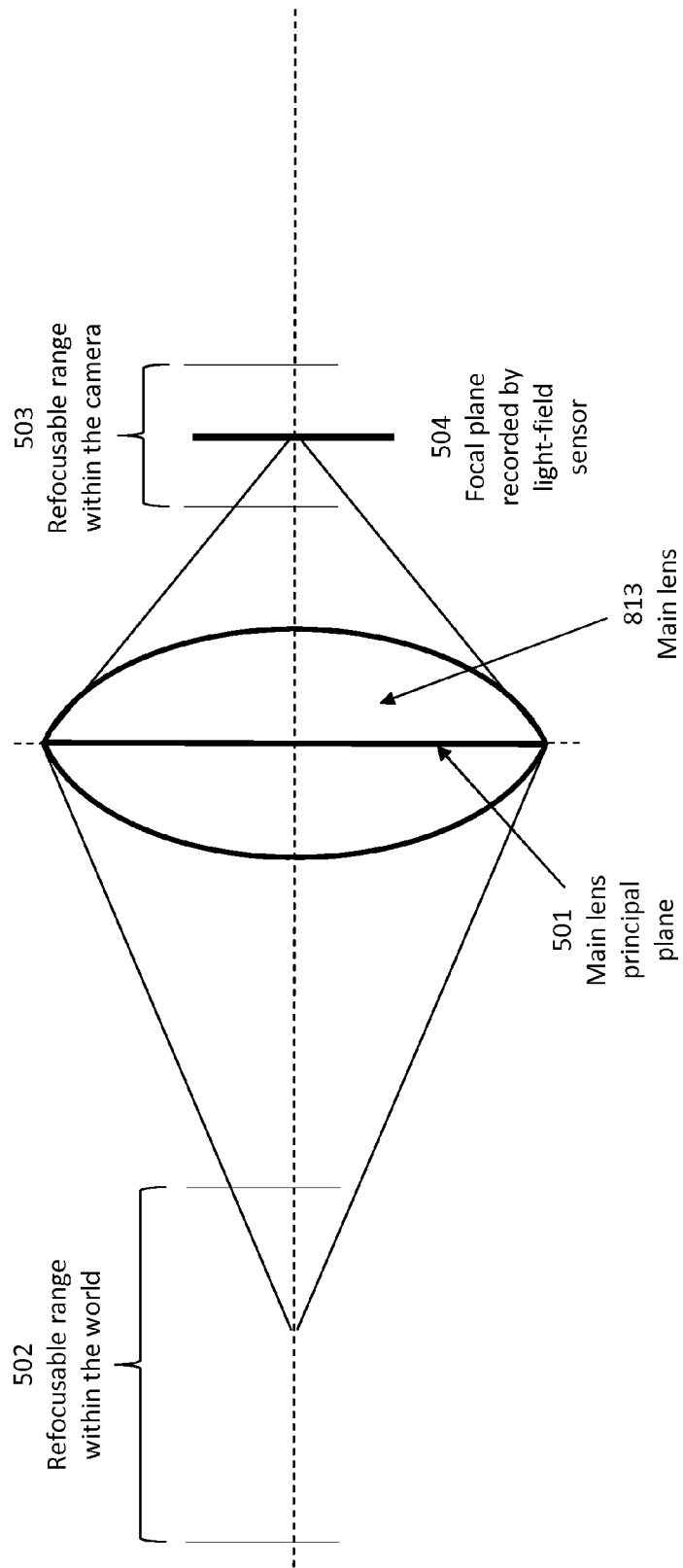
FIGS. 15A and 15B depict an example of the relationship between the position of the focal plane (as determined by the focus position of the main lens) and the refocusable range of the captured light-field data, according to one embodiment.
Figure 15B:
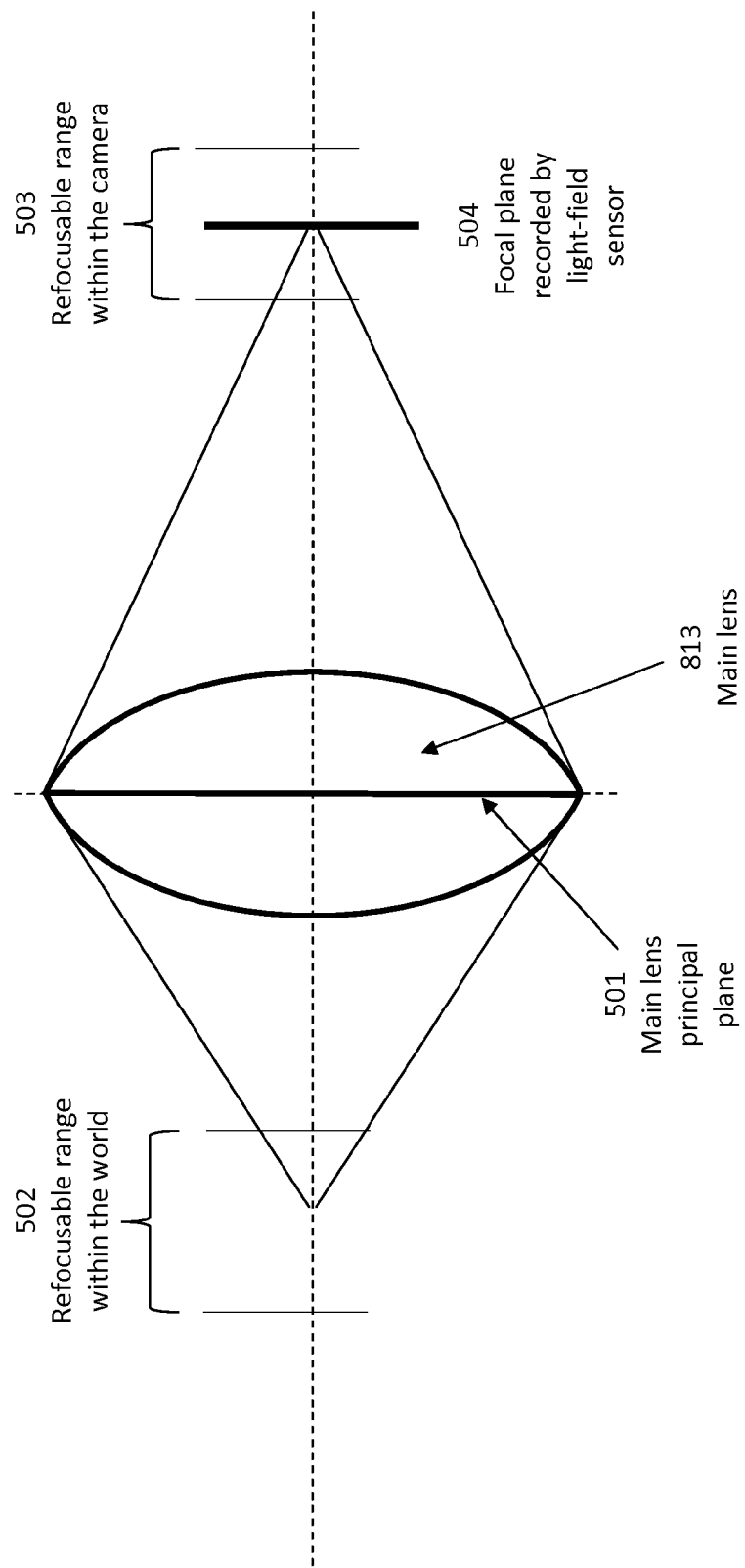

When focal plane 504 is moved inwards within camera 800 (i.e., closer to principal plane 501 of main lens 813), the refocusable range within the world 502 moves closer to camera 800 and also becomes narrower, changing which elements of the scene can be refocused to post-capture. FIGS. 15A and 15B illustrate the relationship between refocusable range 502 within the world and refocusable range 503 within camera 800.

Since the physical position and/or configuration of movable optical elements govern the capabilities of the captured light-field data, controlling these values is an important compositional element of using a light-field capture device 809. In particular, being able to select the position and/or configuration of movable optical elements to satisfactorily frame a given scene, including ensuring that the captured light-field data will enable one or more desired subjects in the scene to be refocused during a post-capture operation, is important to being able to successfully compose light-field data captures.

According to various embodiments of the present invention, any of a number of methods and systems can be implemented for controlling the position and/or configuration of movable optical elements in light-field capture device 809.

For example, any or all of the following mechanisms can be used, singly or in any suitable combination:

Refocusable-to-infinity tracking: For any zoom position of device 809, the focus position of the optics can be set such that the captured light-field data permits refocusing out to optical infinity. By positioning refocusable range 502 such that a point within its refocusable range reaches optical infinity, light-field data captured at this lens configuration will be refocusable from infinity down to a minimum close distance. In one embodiment, optical infinity is set to the furthest point in refocusable range 502 in order to maximize the total depth of refocusable range 502. In another embodiment, optical infinity is set to a specific location within refocusable range 502.

Macro mode: For any zoom position of device 809, the focus position can be set to the furthest position such that a desired minimum close distance, for example the front surface of main lens 813, is within the refocusing range of the light-field data.

Tap-to-select-subject: The user may touch the screen during live-view to indicate a subject of interest, and camera 800 adjusts the focus position of lens 813 such that the specified subject is within the refocusable range of the captured light-field data. The refocusable range may be chosen (by choosing the focus position) in one of several ways (which may be selected via user preferences, or automatically by camera 800), including for example:

Positioning the specified subject at the near or far extreme of the refocusable range.

Positioning the specified subject close to the middle of the refocusable range.

Subject tracking: Given an identified subject of interest (e.g. by the user tapping the screen), subsequent zoom position changes may be made by the user while keeping the desired subject within the refocusable range, and in particular, while keeping the same subject in focus throughout the zoom position changes, by changing the focus position appropriately in tandem with changes to the zoom position.

Multi-subject bracketing: The user may identify a plurality of scene subjects, for example by touching the screen in multiple locations, and camera 800 automatically adjusts the movable optical elements in order to ensure that all desired subjects are within the refocusable range of captured light-field data. Such adjustments may include:

Changing the focus position to best bracket all selected scene subjects within the refocusable range.

Changing both the zoom and focus positions to best attempt to bracket all selected scene subjects within the refocusable range. Note that by changing the zoom position, the field of view and depth of field of the scene are changed, and camera 800 may employ heuristics to choose the best zoom and focus positions such as the following:

Zoom in as far as possible such that (1) all specified subjects of interest are within the field of view and (2) the focus position may be set such that all subjects of interest are within the refocusable range.

Zoom out only to the extent needed to allow the focus position to be set such that all specified subjects of interest are within the refocusable range.

Automatic scene bracketing: Camera 800 analyzes the scene and automatically determines which focus position would result in the contents of the entire scene, or the contents of selected regions of the scene (e.g. a center rectangle), being best bracketed by the refocusable range of captured light-field data.

Automatic face bracketing: Camera 800 analyzes the scene and detect human faces, and then automatically chooses the zoom and/or focus position such that one or more faces are placed within the refocusable range of the light-field data. The choice of which faces to bracket may be made in any of a number of ways, including (but not limited to) the following:

Bracket faces of people that are friends or acquaintances of the user.

Bracket faces that are in the foreground, where the foreground may be defined as scene depths that are not close to optical infinity.

Bracket faces that are near the center of the image.

Bracket faces that are large or prominently featured in the scene.

Balancing live-view optical focusing and software refocusing: The subject of the scene that appears in focus in a live-view image stream is a product of two variables: which scene depth is optically in focus when capturing the light-field data, and which scene depth is subsequently refocused to by using the light-field data. The user may interact with camera 800, for example by tapping the screen, to specify what subject should be in focus in the live-view image stream, and camera 800 may control the optical focus position and the refocusing depth as coupled variables to keep the subject visually in focus on the screen. Given this coupling, camera 800 may employ the following (or any other) strategies to control the focus position of the captured light-field data:

Optically focus camera 800 such that the visually in-focus subject is at the near or far extreme of the refocusing range.

Optically focus camera 800 such that the visually in-focus subject is somewhat close to the center of the refocusing range.

In any or all of the above mechanisms that refer to a "subject" in the scene, for example a mechanism whereby the user specifies a subject of interest by tapping the screen and then this subject is kept sharp and in-focus while camera's 800 zoom position is varied, any of the following mechanisms can be used:

Specification of the subject is interpreted as a one-time specification of a camera-relative depth value. Subsequent changes to camera's 800 position, orientation, focus, or zoom have no effect on the retained depth value. In this embodiment, "tracking the subject" means making adjustments that are consistent with the retained depth value. For example, when camera 800 changes the lens' focus position to "track a subject" and to keep it appearing sharp and in focus on the display as the user is changing the zoom position, in this embodiment, camera 800 acts to keep the specified or determined depth in focus.

Specification of the subject is interpreted as a one-time specification of a spatial coordinate either in camera's 800 field of view or on camera's 800 screen. Analyses performed over time on live-view frames are performed by camera 800 at this spatial coordinate, regardless of whether the contents of the scene are changing. In the case of the coordinate referring to a position in camera's 800 field of view, as camera 800 changes its zoom position and hence changes the imaged field of view, the coordinate is updated accordingly.

The "subject" is interpreted by camera 800 as an object in the scene, for example any scene feature such as a human face, and camera 800 tracks the subject even as it moves within the scene, rather than just using its scene depth at the time that the subject was specified or determined.

Implementation of Subject Depth Determination from Light-field Data

In one embodiment, depth information for a particular scene subject or location may be computed from light-field data using the method described herein.

Implementation of Lens Zoom and Focus Position Determinations for Desired Refocusable Ranges in Captured Light-field Data In one embodiment, given a particular zoom position and a desired refocusable range in the scene, the system of the present invention automatically determines an appropriate lens focus position for capturing light-field data that can be used to generate 2D images spanning (or attempting to span) that refocusable range. If the desired refocusable range exceeds the range that is possible to capture given the particular light-field capture device being used, then in one embodiment, a range is chosen that is somewhat centered within the desired range.

Figure 16:
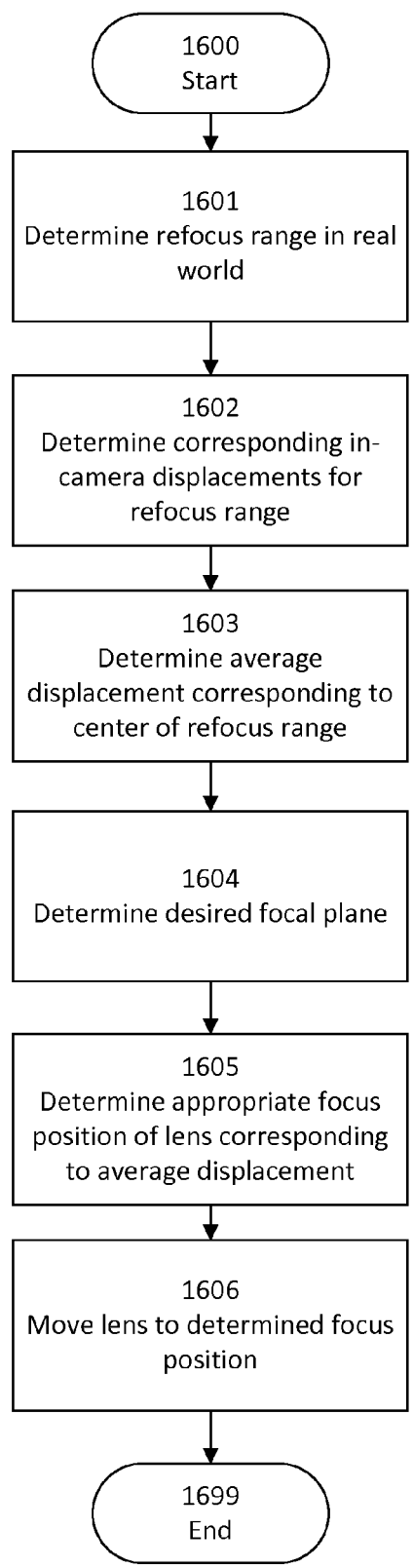
FIG. 16 is a flow diagram depicting a method for automatically moving a lens to a focus position for capturing a particular refocus range, according to one embodiment.

Referring now to FIG. 16, there is shown a flow diagram depicting a method for automatically moving a lens to a focus position for capturing a particular refocus range, according to one embodiment. The desired real-world refocus range is determined 1601, either automatically based on depth positions of objects in the scene, or based on user input or device settings, or by some other mechanism. Based on the real-world refocus range, corresponding in-camera displacements are determined 1602. This can be expressed, for example, as millimeter displacements of light-field sensor's 806 position within camera 800. For example, if the desired refocusable range is expressed in terms of real world distances, then a thin lens equation may be employed to determine the corresponding range limits as in-camera displacements. For example, if the distances from the object to the lens and from the lens to the image are $S_1$ and $S_2$ respectively, for a lens of negligible thickness, in air, the distances are related by the following thin lens equation:

$$\frac{1}{S_1} + \frac{1}{S_2} = \frac{1}{f} \qquad \text{(Eq. 1)}$$

The system then determines 1603 the average of the near and far sensor displacements to determine 1604 the desired focal plane that will center the refocusable range of the captured light-field data on the center of the desired refocusable range. Using a known correspondence between the focus positions of the lens and focal plane distances, for example as is supplied by the lens manufacturer, the appropriate focus position of the lens is determined 1605, and the lens is automatically moved 1606 to the determined focus position.

Figure 17:
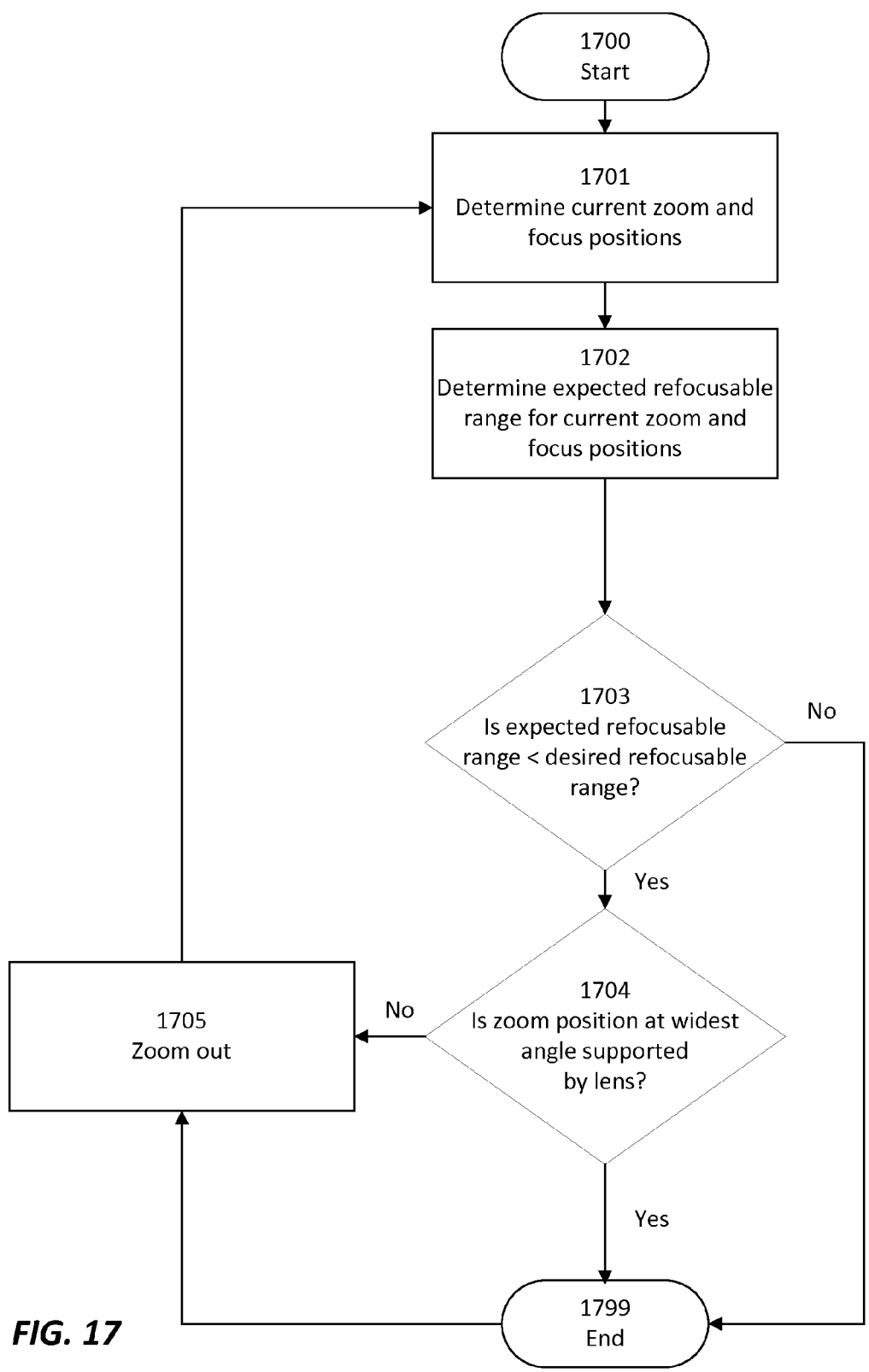
FIG. 17 is a flow diagram depicting a method for automatically adjusting zoom position to provide a desired refocusable range, according to one embodiment.

In at least one embodiment, if the zoom position is also a free variable and the goal is to capture the entire desired refocusable range, then zoom position can be automatically adjusted to optimize the refocusable range. Referring now to FIG. 17, there is shown a flow diagram depicting a method for automatically adjusting zoom position to perform such optimization.

The system determines 1701 the current zoom position and the focus position of camera 800. From this information, it determines 1702 the expected refocusable range of captured light-field data at that (zoom, focus) position pair. The system then determines 1703 whether this refocusable range is less than the desired refocusable range. If not, the method ends 1799.

If, in step 1703, the refocusable range is less than the desired refocusable range, then the system zooms out the lens, if possible. This is done by determining 1704 whether the zoom position is already at the widest angle supported by lens 813. If not, a zoom-out operation is performed 1705, and the system repeats steps 1701 through 1704. Zooming out 1705 causes lens 813 to have a wider angle (shorter focal length), making it possible that the expected refocusable range is now within the desired range. If not, the steps can be repeated until either the expected refocusable range of the light-field data matches or exceeds the desired refocusable range, or the zoom position is at the widest angle supported by lens 813.

In at least one embodiment, if the determined in-camera displacements exceed the operational parameters of the lens assembly, camera 800 can automatically perform a zoom-in operation to increase the focal length and thereby decrease the range of the in-camera displacements needed to cover the real-world refocus range. Such automatic zooming is optional, and can be subject to user settings or approval.

Implementation of Face Detection and Analysis in Light-field Data

In at least one embodiment, face detection and analysis of light-field data may be performed by first generating a 2D image from the light-field data, for example an all-in-focus or extended depth of field (EDOF) image. Any known method(s) can then be used for face detection and analysis of the 2D image. The 2D image can be generated using techniques described above and in the above-cited related patent applications.

Once a face or other object has been detected in a scene, the depth of the face or other object may be determined using any suitable method for determining scene or object depth in light-field data, for example using techniques described above and in the above-cited related patent applications.

Camera Control for Composition and Capture of Light-field Data without Requiring Light-Field-Specific Processing In some embodiments, in addition to mechanisms for making use of light-field processing to enable the user to capture light-field data such that a desired subject is within the refocusable range of such data, the system and method of the present invention can use techniques that do not require any light-field-specific computations. Such embodiments may be useful on light-field capture devices which do not feature the capability to perform light-field processing in real-time at video rates on the captured live-view light-field data.

Figure 18A:
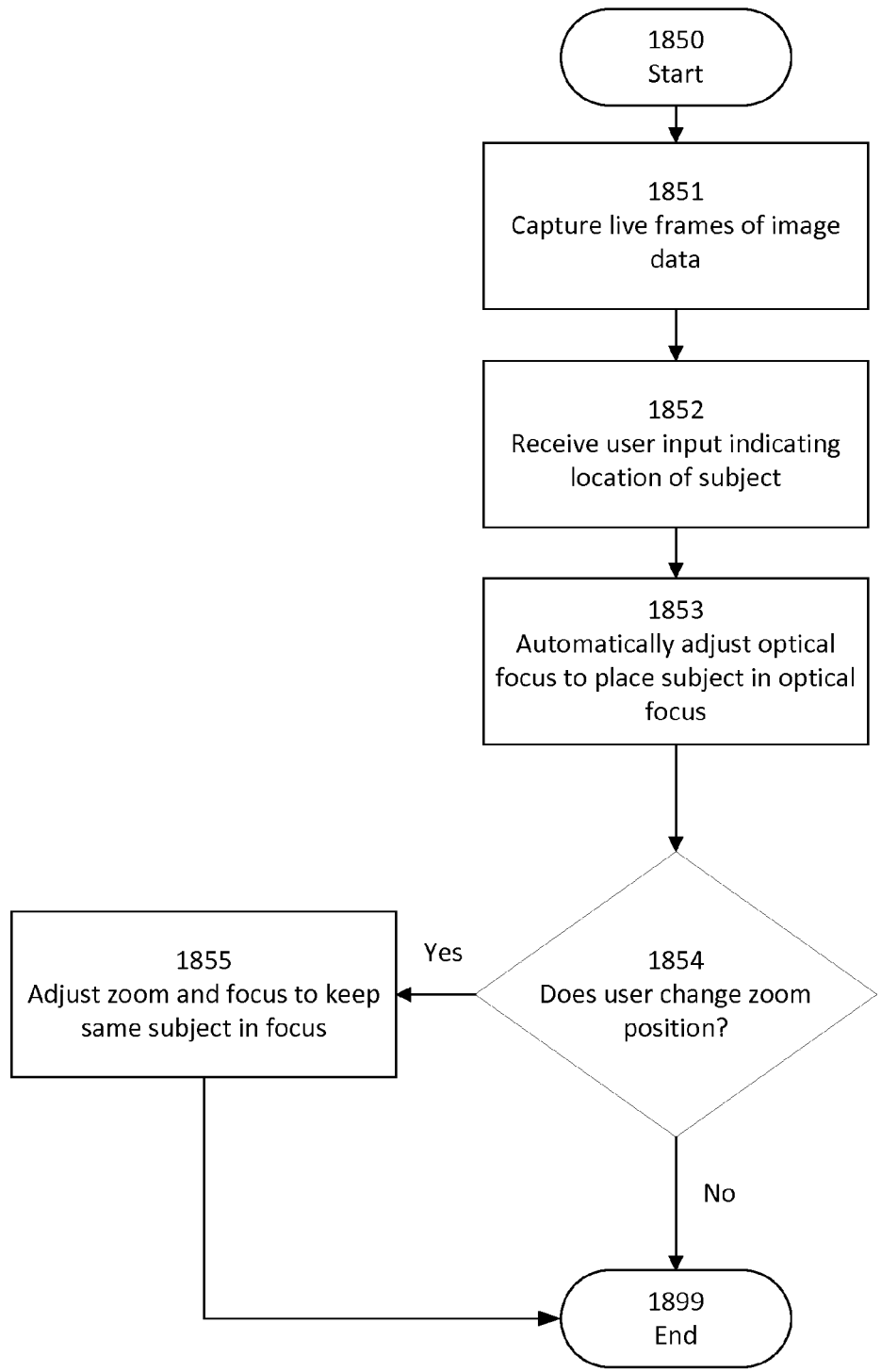
FIG. 18A is a flow diagram depicting a method for using light-field data for real-time focusing, according to one embodiment.

Referring now to FIG. 18A, there is shown a flow diagram depicting an example of a method for using light-field processing in such a manner, specifically to use light-field data for real-time focusing. During a live-view operation, while captured live frames are continuously streamed 1851 to camera 800 display, the user may provide input 1852 indicating a location of a subject of interest within the framed scene. For example, the user may touch the screen or otherwise indicate to camera 800 the location of the subject of interest. Camera 800 may then physically adjust 1853 its optical focus so that the subject selected by the user is in optical focus on an image sensor.

In at least one embodiment, camera 800 may provide output to communicate to the user that such focusing is taking place, and/or can provide additional output when the focusing operation is complete; such output can be visual (for example via camera's 800 display and/or LED indicators), auditory (for example by beeps), and/or haptic. In at least one embodiment, the user can interrupt and/or cancel such automatic focusing at any time by pressing the shutter button; this causes camera 800 to take a picture with the optical focus in whatever state it was when the shutter button was pressed.

In at least one embodiment, if the user changes 1854 the zoom position (or other setting) of camera 800 after it has been optically focused 1853 on a subject, camera 800 automatically adjusts 1855 zoom and/or focus settings to keep the same subject in focus despite the changing focal length. This may be accomplished, for example, by determining the current image plane distance from the focus group position in lens 813, and the current focal length from the zoom group position in lens 813. From those two values, an object plane distance in the world can be computed. When a new zoom position is set, a new image plane distance can be computed based on the object plane distance and new focal length. The new image plane distance may be converted to a focus group position and a new optical focus may be set to keep the subject in focus.

Figure 18B:
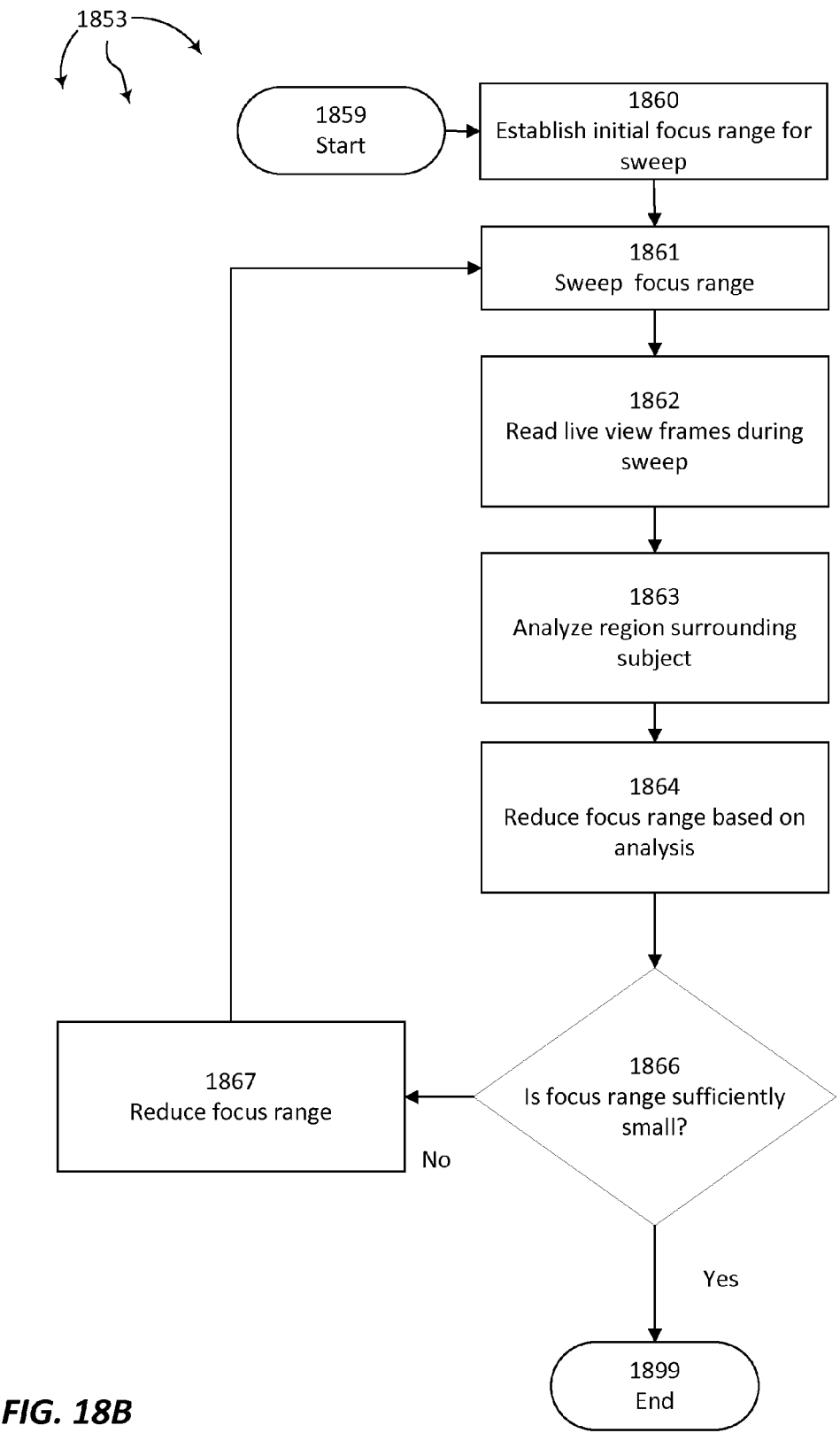
FIG. 18B is a flow diagram depicting a method for successively reducing focus range based on analysis of light-field data, according to one embodiment.

Referring now to FIG. 18B, there is shown a flow diagram depicting a method for automatic optical focusing 1853 by successively reducing focus range based on analysis of light-field data, according to one embodiment. An initial focus range for a focus sweep is established 1860; for example, this initial focus range can be the entire usable focus range of lens 813. Camera 800 then sweeps 1861 through the focus range, for example by moving the focus motor of lens 813, possibly in fixed amounts, through the focus range. Live view frames are read 1862 during the sweep; for example, after each step, a live view frame is read out and a region surrounding the specified subject of interest is analyzed 1863. Based on this analysis 863, the focus range is reduced 1864 to more closely specify a range surrounding optimal focus.

Steps 1861 through 1864 can be performed one or more times, each time reducing the total optical focus range swept as well as the degree to which optical focus is changed per live view frame analyzed. In at least one embodiment, the start and stop positions of each sweep depend on the results of the previous sweep. The number of sweeps may be determined by optimizing for the minimum time required to achieve a desired precision. In at least one embodiment, the system determines 1866 if the focus range is sufficiently small; if not, it reduces 1867 the focus range and repeats steps 1861 to 1864.

Figure 18C:
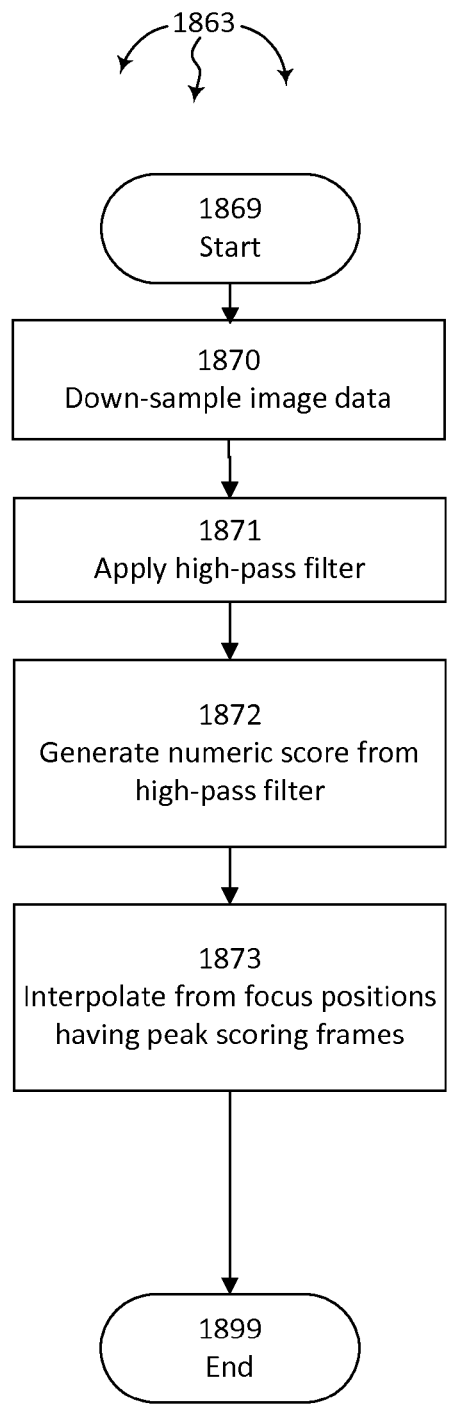
FIG. 18C is a flow diagram depicting a method for analyzing a region of a frame for automatic focusing, according to one embodiment.

Referring now to FIG. 18C, there is shown a flow diagram depicting a method for performing analysis step 1863 for automatic focusing, according to one embodiment. The image data is down-sampled 1870 to increase the signal-to-noise ratio. The image is then filtered 1871 using a high-pass filter. A numeric score is generated 1872 from the results of the high-pass filter; this score represents how much in-focus information is contained in the region surrounding the subject. The focus position corresponding to best optical focus is then determined, for example by interpolating 1873 from focus positions corresponding to peak scoring frames based on their scores.

In at least one embodiment, down-sampling 1870 and filtering 1871 may be performed on one or more color channels of the live-view image, for example the green channel. In at least one embodiment, a convolution box filter may first be applied to the analysis region, and the result may be sub-sampled to produce a smaller single-channel version of the analysis region. To produce the high-pass filtered version of this smaller image, the following filter (Sum-Modified-Laplacian) may be applied:

$$f(x,y)=|2p(x,y)-p(x,y-s)-p(x,y+s)|+|2p(x,y)-p(x,-s,y)-p(x+s,y)| \quad \text{(Eq. 2)}$$

where p(x,y) is the pixel value at coordinates x and y, s is the filter "step", and f(x,y) is the resulting filtered pixel value. The numeric focus score may be generated by computing:

$$\sum_{x,y} f(x,y) \quad \text{(Eq. 3)}$$

In at least one embodiment, if during a sweep 1861, the above-described analysis indicates that numeric scores were sharply increasing and then began to sharply decrease, the sweep can be interrupted early based on detection that the local numerical derivative of focus scores exceeds a certain threshold.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. In a light-field image capture device, a method for automatically focusing an image, comprising:
   capturing a single light-field image;
   generating a plurality of refocused images from the single captured light-field image, each refocused image in the plurality of refocused images having a different scene depth;
   assigning, by a focus metric calculator, an overall focus metric to each refocused image in the plurality of images;
   identifying, by the focus metric calculator, a refocused image having the best overall focus metric;
   automatically selecting a focus motor position to drive a focus motor to the scene depth of the identified refocused image identified as having the best overall focus metric; and
   capturing an image with the focus motor at the selected position.

2. The method of claim 1, wherein generating a plurality of refocused images comprises performing a systematic refocusing sweep to generate a plurality of virtual images, each of the plurality of virtual images being at a different scene depth.

3. The method of claim 1, wherein differences in scene depth are determined in accordance with a depth spacing interval.

4. The method of claim 1, wherein identifying a refocused image having the best overall focus metric comprises using an iterative search.

5. The method of claim 1, further comprising:
   determining a region of interest within the image;
   and wherein identifying the refocused image having the best overall focus metric comprises identifying the refocused image having the best overall focus metric for the determined region of interest.

6. The method of claim 1, wherein assigning an overall focus metric to each refocused image in the plurality of images comprises assigning an overall focus metric to each refocused image in the plurality of images based on the sharpness of the refocused image.

7. The method of claim 1, wherein assigning an overall focus metric to each refocused image in the plurality of images comprises assigning an overall focus metric to each refocused image in the plurality of images based on a gradient within the refocused image.

8. The method of claim 1, wherein assigning an overall focus metric to each refocused image in the plurality of images comprises using a focus function to calculate the overall focus metric for each refocused image in the plurality of images.

9. The method of claim 1, wherein assigning an overall focus metric to each refocused image in the plurality of images comprises measuring high frequency content in at least a portion of each refocused image in the plurality of images.

10. The method of claim 1, wherein generating a plurality of refocused images comprises automatically generating a plurality of virtual images.

11. The method of claim 3, wherein the depth spacing interval is essentially the same between refocused images at adjacent scene depths.

12. The method of claim 3, wherein the depth spacing interval varies between refocused images at adjacent scene depths.

13. The method of claim 5, wherein:
determining a region of interest within the image comprises receiving user input specifying the region of interest.

14. The method of claim 5, wherein:
determining a region of interest within the image comprises automatically selecting the center of the light-field image as the region of interest.

15. The method of claim 5, wherein:
determining a region of interest within the image comprises automatically selecting the region of interest by weighting a plurality of different points in the light-field image.

16. A computer program product for use in a light-field image capture device, the computer program product for implementing a method for automatically focusing an image, the computer program product comprising one or more computer storage devices having stored thereon computer-executable instructions that, when executed at a processor, cause the light-field capture device to:
capture a single light-field image;
generate a plurality of refocused images from the single captured light-field image, each refocused image in the plurality of refocused images having a different scene depth;
cause a focus metric calculator to assign an overall focus metric to each refocused image in the plurality of images;
cause the focus metric calculator to identify a refocused image having the best overall focus metric;
automatically select a focus motor position to drive a focus motor to the scene depth of the identified refocused image identified as having the best overall focus metric; and
capture an image with the focus motor at the selected position.

17. The computer program product of claim 16, wherein the computer-executable instructions that, when executed, cause the light-field capture device to generate a plurality of refocused images comprise computer-executable instructions that, when executed, cause the light-field capture device to perform a systematic refocusing sweep to generate a plurality of virtual images, each of the plurality of virtual images being at a different scene depth.

18. The computer program product of claim 16, wherein the computer-executable instructions that, when executed, cause the light-field capture device to generate a plurality of refocused images comprise computer-executable instructions that, when executed, cause the light-field capture device to generate a plurality of refocused images in accordance with a depth spacing interval.

19. The computer program product of claim 16, wherein the computer-executable instructions that, when executed, cause the light-field capture device to identify a refocused image having the best overall focus metric comprise computer-executable instructions that, when executed, cause the light-field capture device to identify a refocused image using an iterative search.

20. The computer program product of claim 16, wherein the computer-executable instructions that, when executed, cause the light-field capture device to assign an overall focus metric to each refocused image comprise computer-executable instructions that, when executed, cause the light-field capture device to assign an overall focus metric to each refocused image by at least of: using a focus function to calculate the overall focus metric for each refocused image, using a gradient within the refocused image, and measuring high frequency content in at least a portion of each refocused image.

21. The computer program product of claim 16, wherein the computer-executable instructions that, when executed, cause the light-field capture device to generate a plurality of refocused images comprise computer-executable instructions that, when executed, cause the light-field capture device to generate a plurality of virtual images.

22. The computer program product of claim 16, further comprising computer-executable instructions that, when executed, cause the light-field capture device to:
determine a region of interest within the image;
and wherein the computer-executable instructions that, when executed, cause the light-field capture device to identify the refocused image having the best overall focus metric comprise computer-executable instructions that, when executed, cause the light-field capture device to identify the refocused image having the best overall focus metric for the determined region of interest.

23. The computer program product of claim 22, wherein the computer-executable instructions that, when executed, cause the light-field capture device to determine a region of interest within the image comprise computer-executable instructions that, when executed, cause the light-field capture device to automatically select the region of interest by at least one of: selecting the center of the light-field image and weighting a plurality of different points in the light-field image.

24. A light-field image capture device, the light-field image capture devices comprising:
an optical system, the optical system configured to capture a single light-field image;
a focus motor, configured to control a focus position of the optical system;
processing components, coupled to the optical system, the processing components configured to generate a plurality of refocused images from the single light-field image, each refocused image in the plurality of refocused images having a different scene depth; and
a focus metric calculator, coupled to the processing components and to the focus motor, the focus metric calculator configured to:
assign an overall focus metric to each refocused image in the plurality of images;
identify a refocused image having the best overall focus metric; and
automatically select a focus motor position to drive the focus motor to the scene depth of the identified refocused image identified as having the best overall focus metric;
the optical system further configured to capture an image with the focus motor at the selected position.

25. The light-field image capture device of claim 24, wherein the optical system comprises: a main lens, a microlens array, and at least one light-field sensor.

26. The light-field image capture device of claim 24, wherein the processing components configured to generate a plurality of refocused images comprise processing circuitry configured to perform a systematic refocusing sweep to generate a plurality of virtual images, each of the plurality of virtual images being at a different scene depth.

27. The light-field image capture device of claim 24, wherein the focus metric calculator identifying a refocused image having the best focus metric comprises identifying a refocused image using an iterative search.

28. The light-field image capture device of claim 24, wherein the focus metric calculator is configured to assign an overall focus metric to each refocused image based on at least one of: the sharpness of the refocused image, a gradient within the refocuses image, a focus function, and high frequency content measured in at least a portion of the refocused image.

29. The light-field capture device of claim 24, further comprising:
at least one processor, coupled to the processing components; and
system memory coupled to the at least one processor;
wherein computer-executable instructions are executed on at least one processor to provide the functionality of the focus metric calculator.

30. The light-field image capture device of claim 24, wherein the processing components are further configured to determine a region of interest within the image;
and wherein the focus metric calculator is configured to identify the refocused image having the best overall focus metric by identifying the refocused image having the best overall focus metric for the determined region of interest.

31. The light-field image capture device of claim 25, wherein the focus motor is configured to focus the main lens.

32. The light-field image capture device of claim 31, further comprising a user interface and at least one input device, the user-interface and the at least one input device configured to interoperate to receive a focus request for refocusing the main lens.

33. The light-field image capture device of claim 26, wherein the processing circuitry performing a refocusing sweep to generate a plurality of virtual images comprises performing a systematic refocusing sweep to generate a plurality of virtual images in accordance with a depth spacing interval.

34. The light-field image capture device of claim 30, further comprising a user interface and at least one input device, the user-interface and the at least one input device configured to receive user input specifying the region of interest.

* * * * *